United States Patent
El-Kady et al.

(10) Patent No.: US 10,734,167 B2
(45) Date of Patent: Aug. 4, 2020

(54) POROUS INTERCONNECTED CORRUGATED CARBON-BASED NETWORK (ICCN) COMPOSITE

(71) Applicant: The Regents of the University of California, Oakland, CA (US)

(72) Inventors: Maher F. El-Kady, Los Angeles, CA (US); Richard B. Kaner, Pacific Palisades, CA (US); Jee Youn Hwang, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 166 days.

(21) Appl. No.: 14/945,232

(22) Filed: Nov. 18, 2015

(65) Prior Publication Data
US 2016/0148759 A1    May 26, 2016

Related U.S. Application Data

(60) Provisional application No. 62/081,237, filed on Nov. 18, 2014.

(51) Int. Cl.
*H01G 11/36* (2013.01)
*H01G 11/86* (2013.01)
(Continued)

(52) U.S. Cl.
CPC ........... *H01G 11/36* (2013.01); *C01B 32/184* (2017.08); *C01B 32/194* (2017.08); *C25D 9/08* (2013.01);
(Continued)

(58) Field of Classification Search
CPC ........ H01G 11/36; H01G 11/46; H01G 11/86; H01G 11/26; H01G 11/70; C25D 15/00;
(Continued)

(56) References Cited

U.S. PATENT DOCUMENTS 2,800,616 A    7/1957 Becker
3,288,641 A    11/1966 Rightmire
(Continued)

FOREIGN PATENT DOCUMENTS

CN    100372035 C    2/2008
CN    101723310 A    6/2010
(Continued)

OTHER PUBLICATIONS

Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
(Continued)

*Primary Examiner* — Catherine A. Simone
(74) *Attorney, Agent, or Firm* — Withrow & Terranova, P.L.L.C.

(57) ABSTRACT

A porous interconnected corrugated carbon-based network (ICCN) composite and methods for making the same are disclosed. The porous ICCN composite is made up of a plurality of carbon layers that are interconnected and expanded apart from one another to form a plurality of pores. Metallic nanoparticles are disposed within the plurality of pores. In one embodiment, a light exposure only based method for producing the porous ICCN composite is disclosed. In another embodiment a light exposure plus an electrodeposition method for producing the porous ICCN composite is disclosed. In yet another exemplary embodiment, a capacitor having a first electrode and a second electrode separated from the first electrode by a dielectric wherein at least one of the first electrode and the second electrode is formed from the porous ICCN composite is disclosed.

21 Claims, 5 Drawing Sheets

(51) Int. Cl.
*H01G 11/46* (2013.01)
*H01G 11/26* (2013.01)
*C25D 9/08* (2006.01)
*C01B 32/184* (2017.01)
*C01B 32/194* (2017.01)
*H01G 11/70* (2013.01)
*H01G 11/02* (2013.01)

(52) U.S. Cl.
CPC ............. *H01G 11/02* (2013.01); *H01G 11/26* (2013.01); *H01G 11/46* (2013.01); *H01G 11/70* (2013.01); *H01G 11/86* (2013.01); *Y02E 60/13* (2013.01); *Y02T 10/7022* (2013.01)

(58) Field of Classification Search
CPC ..... C25D 9/08; B32B 3/12; Y10T 428/24149; Y10T 428/24157; Y10T 428/24165; C01B 2204/04; C01B 32/184; C01B 32/194; B82Y 30/00; B82Y 40/00
USPC ........ 428/116, 117, 118, 323, 328, 329, 330, 428/408
See application file for complete search history.

(56) References Cited

U.S. PATENT DOCUMENTS

| | | | |
|---|---|---|---|
| 3,536,963 A | 10/1970 | Boos | |
| 3,652,902 A | 3/1972 | Hart et al. | |
| 5,225,296 A | 7/1993 | Ohsawa et al. | |
| 5,442,197 A | 8/1995 | Andrieu et al. | |
| 6,043,630 A | 3/2000 | Koenck et al. | |
| 6,117,585 A | 9/2000 | Anani et al. | |
| 6,451,074 B2 | 9/2002 | Bluvstein et al. | |
| 6,510,043 B1 | 1/2003 | Shiue et al. | |
| 6,522,522 B2 | 2/2003 | Yu et al. | |
| 6,982,517 B2 | 1/2006 | Reineke et al. | |
| 7,623,340 B1 | 11/2009 | Song et al. | |
| 7,875,219 B2 | 1/2011 | Zhamu et al. | |
| 8,315,039 B2 | 11/2012 | Zhamu et al. | |
| 8,503,161 B1 | 8/2013 | Chang et al. | |
| 8,593,714 B2 | 11/2013 | Agrawal et al. | |
| 8,753,772 B2 | 6/2014 | Liu et al. | |
| 8,771,630 B2 | 7/2014 | Wu et al. | |
| 8,828,608 B2 | 9/2014 | Sun et al. | |
| 8,906,495 B2 | 12/2014 | Chen | |
| 8,951,675 B2 | 2/2015 | Bhardwaj et al. | |
| 9,118,078 B2 | 8/2015 | Huang et al. | |
| 9,295,537 B2 | 3/2016 | Cao | |
| 9,437,372 B1 | 9/2016 | Zhamu et al. | |
| 2002/0136881 A1 | 9/2002 | Yanagisawa et al. | |
| 2002/0160257 A1 | 10/2002 | Lee et al. | |
| 2003/0013012 A1 | 1/2003 | Ahn et al. | |
| 2003/0169560 A1 | 9/2003 | Welsch et al. | |
| 2004/0090736 A1 | 5/2004 | Bendale et al. | |
| 2005/0153130 A1 | 7/2005 | Long et al. | |
| 2006/0121342 A1 | 6/2006 | Sano et al. | |
| 2006/0201801 A1 | 9/2006 | Bartlett et al. | |
| 2006/0269834 A1 | 11/2006 | West et al. | |
| 2007/0172739 A1 | 7/2007 | Visco et al. | |
| 2007/0204447 A1 | 9/2007 | Bernstein et al. | |
| 2008/0090141 A1 | 4/2008 | Meitav et al. | |
| 2008/0158778 A1 | 7/2008 | Lipka et al. | |
| 2008/0180883 A1 | 7/2008 | Palusinski et al. | |
| 2008/0199737 A1 | 8/2008 | Kazaryan et al. | |
| 2008/0220293 A1 | 9/2008 | Marmaropoulos et al. | |
| 2009/0059474 A1 | 3/2009 | Zhamu et al. | |
| 2009/0117467 A1 | 5/2009 | Zhamu et al. | |
| 2009/0289328 A1 | 11/2009 | Tanioku | |
| 2010/0159346 A1 | 6/2010 | Hinago et al. | |
| 2010/0159366 A1 | 6/2010 | Shao-Horn et al. | |
| 2010/0195269 A1 | 8/2010 | Kim et al. | |
| 2010/0203362 A1 | 8/2010 | Lam et al. | |
| 2010/0221508 A1 | 9/2010 | Huang et al. | |
| 2010/0226066 A1 | 9/2010 | Sweeney et al. | |
| 2010/0237296 A1 | 9/2010 | Gilje | |
| 2010/0266964 A1 | 10/2010 | Gilje | |
| 2010/0273051 A1 | 10/2010 | Choi et al. | |
| 2010/0317790 A1 | 12/2010 | Jang et al. | |
| 2011/0026189 A1 | 2/2011 | Wei et al. | |
| 2011/0111283 A1 | 5/2011 | Rust, III et al. | |
| 2011/0111299 A1 | 5/2011 | Liu et al. | |
| 2011/0143101 A1 | 6/2011 | Sandhu | |
| 2011/0159372 A1 | 6/2011 | Zhamu et al. | |
| 2011/0163274 A1 | 7/2011 | Plee et al. | |
| 2011/0163699 A1 | 7/2011 | Elder et al. | |
| 2011/0183180 A1 | 7/2011 | Yu et al. | |
| 2011/0227000 A1 | 9/2011 | Ruoff et al. | |
| 2011/0256454 A1 | 10/2011 | Nicolas et al. | |
| 2011/0318257 A1 | 12/2011 | Sokolov et al. | |
| 2012/0111730 A1 | 5/2012 | Choi et al. | |
| 2012/0129736 A1 | 5/2012 | Tour et al. | |
| 2012/0134072 A1 | 5/2012 | Bae et al. | |
| 2012/0145234 A1 | 6/2012 | Roy-Mayhew et al. | |
| 2012/0300364 A1 | 11/2012 | Cai et al. | |
| 2012/0313591 A1 | 12/2012 | Brambilla et al. | |
| 2013/0026409 A1 | 1/2013 | Baker et al. | |
| 2013/0048949 A1 | 2/2013 | Xia et al. | |
| 2013/0056346 A1 | 3/2013 | Sundara et al. | |
| 2013/0056703 A1 | 3/2013 | Elian et al. | |
| 2013/0100581 A1 | 4/2013 | Jung et al. | |
| 2013/0161570 A1 | 6/2013 | Hwang et al. | |
| 2013/0168611 A1 | 7/2013 | Zhou et al. | |
| 2013/0180912 A1 | 7/2013 | Li | |
| 2013/0182373 A1 | 7/2013 | Yu et al. | |
| 2013/0189602 A1 | 7/2013 | Lahiri et al. | |
| 2013/0217289 A1 | 8/2013 | Nayfeh et al. | |
| 2013/0264041 A1 | 10/2013 | Zhamu et al. | |
| 2013/0266858 A1 | 10/2013 | Inoue et al. | |
| 2013/0280601 A1 | 10/2013 | Geramita et al. | |
| 2013/0314844 A1 | 11/2013 | Chen et al. | |
| 2013/0330617 A1 | 12/2013 | Yoshimura et al. | |
| 2014/0029161 A1 | 1/2014 | Beidaghi et al. | |
| 2014/0030590 A1 | 1/2014 | Wang et al. | |
| 2014/0045058 A1 | 2/2014 | Zhao et al. | |
| 2014/0065447 A1 | 3/2014 | Liu et al. | |
| 2014/0099558 A1 | 4/2014 | Itakura et al. | |
| 2014/0118883 A1 | 5/2014 | Xie | |
| 2014/0120453 A1 | 5/2014 | Ajayan et al. | |
| 2014/0154164 A1 | 6/2014 | Chen et al. | |
| 2014/0178763 A1 | 6/2014 | Mettan | |
| 2014/0205841 A1 | 7/2014 | Qui et al. | |
| 2014/0255776 A1 | 9/2014 | Song et al. | |
| 2014/0255785 A1 | 9/2014 | Do et al. | |
| 2014/0287308 A1 | 9/2014 | Okada et al. | |
| 2014/0313636 A1 | 10/2014 | Tour et al. | |
| 2014/0323596 A1 | 10/2014 | Jeong et al. | |
| 2015/0098167 A1 | 4/2015 | El-Kady et al. | |
| 2015/0103469 A1 | 4/2015 | Lee et al. | |
| 2015/0111449 A1 | 4/2015 | Cruz-Silva et al. | |
| 2015/0218002 A1 | 8/2015 | Plomb et al. | |
| 2015/0235776 A1 | 8/2015 | Miller | |
| 2015/0259212 A1 | 9/2015 | Li et al. | |
| 2015/0287544 A1 | 10/2015 | Irazoqui et al. | |
| 2015/0332868 A1 | 11/2015 | Jung et al. | |
| 2015/0364738 A1 | 12/2015 | Pope et al. | |
| 2015/0364755 A1 | 12/2015 | Liu et al. | |
| 2016/0035498 A1 | 2/2016 | Honma et al. | |
| 2016/0055983 A1 | 2/2016 | Kurungot et al. | |
| 2016/0077074 A1 | 3/2016 | Strong et al. | |
| 2016/0099116 A1 | 4/2016 | Yang | |
| 2016/0133396 A1 | 5/2016 | Hsieh | |
| 2017/0240424 A1 | 8/2017 | Roberts et al. | |
| 2017/0338472 A1 | 11/2017 | Zhamu et al. | |
| 2019/0006675 A1 | 1/2019 | Cheng et al. | |
| 2019/0088420 A1 | 3/2019 | Tour et al. | |

FOREIGN PATENT DOCUMENTS

| | | |
|---|---|---|
| CN | 101894679 A | 11/2010 |
| CN | 102543483 A | 7/2012 |
| CN | 102923698 A | 2/2013 |
| CN | 103208373 A | 7/2013 |
| CN | 103723715 A | 4/2014 |

(56) References Cited

FOREIGN PATENT DOCUMENTS

| | | |
|---|---|---|
| CN | 203631326 U | 6/2014 |
| CN | 203839212 U | 9/2014 |
| CN | 104299794 A | 1/2015 |
| CN | 104355306 A | 2/2015 |
| CN | 10463794 A | 5/2015 |
| CN | 104617300 A | 5/2015 |
| EP | 1843362 A1 | 10/2007 |
| EP | 2088637 A2 | 8/2009 |
| EP | 2933229 A1 | 10/2015 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 2005138204 A | 6/2005 |
| JP | 2005199267 A | 7/2005 |
| JP | 20050317902 A | 11/2005 |
| JP | 2006252902 A | 9/2006 |
| JP | 2007160151 A | 6/2007 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2013534686 A | 9/2013 |
| JP | 2014053209 A | 3/2014 |
| KR | 20070083691 A | 8/2007 |
| KR | 10-2009-0107498 A | 10/2009 |
| KR | 1020100114827 B1 | 4/2017 |
| WO | 9632618 A1 | 10/1996 |
| WO | 2011019431 A1 | 2/2011 |
| WO | 2011021982 A1 | 2/2011 |
| WO | 2011072213 A2 | 6/2011 |
| WO | WO-2012006657 A1 * | 1/2012 ......... B01D 67/0079 |
| WO | 2012087698 A1 | 6/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |
| WO | WO-2013134207 A1 * | 9/2013 ............. H01G 11/24 |
| WO | 2013155276 A1 | 10/2013 |
| WO | 2014011722 A2 | 1/2014 |
| WO | 2014062133 A1 | 4/2014 |
| WO | 2014072877 A2 | 5/2014 |
| WO | 2014134663 A1 | 9/2014 |
| WO | 2015023974 A1 | 2/2015 |
| WO | 2015069332 A1 | 5/2015 |
| WO | 2015153895 A1 | 10/2015 |
| WO | 2015195700 A1 | 12/2015 |
| WO | 2016094551 A1 | 6/2016 |

OTHER PUBLICATIONS

Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, WILEY-VCH Verlag GmbH & Co., pp. 1-7.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qu, Qunting et al., "Core—Shell Structure of Polypyrrole Grown on $V_2O_5$ Nanoribbon as High Performance Anode Material for Supercapacitors," Advanced Energy Materials, vol. 2, Issue 8, 2012, WILEY-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Vonlanthen, David et al., "A Stable Polyaniline-Benzoquinone-Hydroquinone Supercapacitor," Advanced Materials, vol. 26, Issue 30, Jun. 13, 2014, WILEY-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.

(56) References Cited

OTHER PUBLICATIONS

Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.

Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.

Wang, Kai, et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.

Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.

Weng, Zhe et al., "Graphene-Cellulose Paper Flexible Supercapacitors," Advanced Energy Materials, vol. 1, Issue 5, Aug. 10, 2011, WILEY-VCH Verlag GmbH & Co., pp. 917-922.

Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.

Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.

Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.

Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.

Yan, Jun et al., "Recent Advances in Design and Fabrication of Electrochemical Supercapacitors with High Energy Densities," Advanced Energy Materials, vol. 4, Issue 4, 1300816, Dec. 23, 2013, WILEY-VCH Verlag GmbH & Co., pp. 1-43.

Yang, Xiaowei, et al, "Bioinspired Effective Prevention of Restacking in Multilayered Graphene Films: Towards the Next Generation of High-Performance Supercapacitors," Advanced Materials, vol. 23, Issue 25, May 10, 2011, WILEY-VCH Verlag GmbH & Co., pp. 2833-2838.

Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.

Yoo, Jung Joon et al., "Ultrathin Planar Graphene Supercapacitors," Nano Letters, vol. 11, Issue 4, Mar. 7, 2011, American Chemical Society, pp. 1423-1427.

Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.

Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.

Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.

Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.

Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.

Zhang, Li et al., "High Voltage Super-capacitors for Energy Storage Devices Applications," 14th Symposium on Electromagnetic Launch Technology, Jun. 10-13, 2008, IEEE, pp. 1-4.

Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.

Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.

Zhou, Chuanqiang et al., "Synthesis of Polyaniline Hierarchical Structures in a Dilute SDS/HCl Solution: Nanostructure-Covered Rectangular Tubes," Macromolecules, vol. 42, Issue 4, Jan. 27, 2009, American Chemical Society, pp. 1252-1257.

Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.

Zhu, Xianjun et al., "Nanostructured Reduced Graphene Oxide/$Fe_2O_3$ Composite as a High-Performance Anode Material for Lithium Ion Batteries," ACS Nano, vol. 5, Issue 4, Mar. 28, 2011, American Chemical Society, pp. 3333-3338.

Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.

Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.

Ozawa, Kazunori, "Lithium-Cell System—Nonaqueous Electrolyte System," Lithium Ion Rechargeable Batteries (book), Chapter 1: General Concepts, Section 1.1.2, 2009, WILEY-VCH Verlag GmbH & Co. KGaA, 5 pages.

Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.

Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.

Author Unknown, "ELTON: Products and Technology," https://web.archive.org/web/20160306044847/http://www.elton-cap.com/products/, dated Mar. 6, 2016, retrieved Mar. 15, 2017, ELTON, 2 pages.

Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.

Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.

Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.

Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.

Burke, Andrew, "R&D considerations for the performance and application of electrochemical capacitors," Electrochimica Acta, vol. 53, Jan. 26, 2007, Elsevier Ltd., pp. 1083-1091.

(56) References Cited

OTHER PUBLICATIONS

Chan, Candace K. et al, "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.
Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.
Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.
Deville, Sylvain, "Freeze-Casting of Porous Ceramics: A Review of Current Achievements and Issues," Advanced Engineering Materials, vol. 10, Issue 3, Mar. 20, 2008, WILEY-VCH Verlag GmbH & Co., pp. 155-169.
Deville, Sylvain, "Metastable and unstable cellular solidification of colloidal suspensions," Nature Materials, vol. 8, Dec. 2009, Macmillan Publishers Limited, pp. 966-972.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, WILEY-VCH Verlag GmbH & Co., pp. 2392-2415.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, WILEY-VCH Verlag GmbH & Co, pp. 3958-3964.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of $3\text{-}Ni(OH)_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.
Lam, L.T. et al., "Development of ultra-battery for hybrid-electric vehicle applications," Journal of Power Sources, vol. 158, Issue 2, May 2, 2006, Elsevier B.V., pp. 1140-1148.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.
Linden, David et al., "Handbook of Batteries," McGraw-Hill Handbooks, Third Edition, 2010, New York, The McGraw-Hill Companies, Inc., 1,454 pages.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjan, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.

(56) References Cited

OTHER PUBLICATIONS

Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Fourth Office Action for Chinese Patent Application No. 201280070343.4, dated Apr. 26, 2017, 22 pages.
Notice of Reason for Rejection for Japanese Patent Application No. 2014-548972, dated May 23, 2017, 4 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/023632, dated May 31, 2017, 11 pages.
Allen, Matthew J., et al., "Honeycomb Carbon: A Review of Graphene," Chemical Reviews, vol. 110, Issue 1, Jul. 17, 2009, American Chemical Society, pp. 132-145.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Arthur, Timothy, S., et al., "Three-dimensional electrodes and battery architectures," MRS Bulletin, vol. 36, Jul. 2011, Materials Research Society, pp. 523-531.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884 (2014).
Beidaghi, Majid, et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, WILEY-VCH Verlag GmbH & Co. KGaA, Weinheim, pp. 4501-4510.
Beidaghi, Majid, et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel, et al., "Manganese Oxides: Battery Materials Make the Leap to Electrochemical Capacitors," Electrochemical Society Interface, vol. 17, Issue 1, Spring 2008, The Electrochemical Society, pp. 49-52.

Brodie, B.C., "Ueber das Atomgewicht des Graphits," Justus Liebigs Annalen der Chemie, vol. 114, Issue 1, 1860, WILEY-VCH Verlag GmbH & Co. KGaA, Weinheim, pp. 6-24.
Cao, Liujun, et al., "Direct Laser-Patterned Micro-Supercapacitors from Paintable $MoS_2$ Films," Small, vol. 9, Issue 17, Apr. 16, 2013, WILEY-VCH Verlag GmbH & Co. KGaA, Weinheim, pp. 2905-2910.
Chen, L. Y., et al., "Toward the Theoretical Capacitance of $RuO_2$ Reinforced by Highly Conductive Nanoporous Gold," Advanced Energy Materials, vol. 3, Issue 7, Jul. 2014, WILEY-VCH Verlag GmbH & Co. KGaA, Weinheim, pp. 851-856.
Chen, Wei, et al., "High-Performance Nanostructured Supercapacitors on a Sponge," Nano Letters, vol. 11, Issue 12, Sep. 16, 2011, American Chemical Society, 22 pages.
Cheng, Yingwen, et al., "Synergistic Effects from Graphene and Carbon Nanotubes Enable Flexible and Robust Electrodes for High-Performance Supercapacitors," Nano Letters, vol. 12, Issue 8, Jul. 23, 2012, American Chemical Society, pp. 4206-4211.
Chmiola, John, et al., "Monolithic Carbide-Derived Carbon Films for Micro-Supercapacitors," Science, vol. 328, Issue 5977, Apr. 2010, American Association for the Advancement of Science, 4 pages.
Choi, Bong Gill, et al., "3D Macroporous Graphene Frameworks for Supercapacitors with High Energy and Power Densities," ACS Nano, vol. 6, Issue 5, Apr. 23, 2012, American Chemical Society, pp. 4020-4028.
De Volder, Michaël, et al., "Corrugated Carbon Nanotube Microstructures with Geometrically Tunable Compliance," ACS Nano, vol. 5, Issue 9, Aug. 1, 2011, pp. 7310-7317.
El-Kady, Maher F., et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F., et al., "Laser Scribing of High-Performance and Flexible Graphene-Based Electrochemical Capacitors", Science Magazine, Mar. 16, 2012, vol. 335, No. 6074, 6 pages.
El-Kady, Maher F., et al., "Laser Scribing of High-Performance and Flexibile Graphene-Based Electrochemical Capacitors," Supporting Online Material—Science Magazine, Published Mar. 16, 2012, 25 pages, www.sciencemag.org/cgi/content/full/335/6074/1326/DC1.
El-Kady, Maher F., et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F., et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Feng, Jun, et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne E., et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, Ce Yao, et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, WILEY-VCH Verlag GmbH & Co. KGaA, Weinheim, pp. 1-7.
Gao, Wei, et al., "Direct laser writing of micro-supercapacitors on hydrated graphite oxide films," Nature Nanotechnology, vol. 6, Issue 8, Jul. 2011, Macmillan Publishers Limited, p. 496-500.
Gao, Wei, et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai, et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.

(56) References Cited

OTHER PUBLICATIONS

Gao, Yu, et al., "High power supercapcitor electrodes based on flexible TiC-CDC nano-felts," Journal of Power Sources, vol. 201, Issue 1, Mar. 2012, Elsevier B.V., pp. 368-375.
Gilje, Scott, et al., "Photothermal Deoxygenation of Graphene Oxide for Patterning and Distributed Ignition Applications," Advanced Materials, vol. 22, Issue 3, Oct. 26, 2009, WILEY-VCH Verlag GmbH & Co. KGaA, Weinheim, Germany, pp. 419-423.
Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y., et al., "True Performance Metrics in Electrochemical Energy Storage," Science Magazine, vol. 334, Issue 6058, Nov. 18, 2011, 4 pages.
Gracia, J., et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie, et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L., et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Hu, Liangbing, et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi, et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming, et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y., et al., "Direct preparation and processing of graphene/$RuO_2$ nanocomposite electrodes for high-performance capacitive energy storage," Nano Energy, vol. 18, Sep. 25, 2015, Elsevier B.V., pp. 57-70.
Ji, Junyi, et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Kang, Yu Jin, et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khomenko, V., et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.
Kovtyukhova, Nina, I., et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lang, Xingyou, et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyoung, G., et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo, et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Li, Dan, et al., "Processable aqueous dispersions of graphene nanosheets," Nature Nanotechnology, vol. 3, Feb. 2008, Nature Publishing Group, pp. 101-105.
Li, Peixu, et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi, et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Lin, Jian, et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Naoi, Katsuhiko et al., "Second generation 'nanohybrid supercapacitor': Evolution of capacitive energy storage devices," Energy & Environmental Science, vol. 5, Issue 11, Aug. 9, 2012, The Royal Society of Chemistry, pp. 9363-9373.
Non-Final Office Action for U.S. Appl. No. 14/382,463, dated Jan. 6, 2017, 23 pages.
First Office Action and Search Report for Chinese Patent Application No. 201380023699.7, dated Nov. 21, 2016, 21 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
First Examination Report for Australian Patent Application No. 2012378149, dated Jul. 28, 2016, 3 pages.
First Examination Report for Australian Patent Application No. 2013230195, dated May 27, 2016, 4 pages.
Zoski, Cynthia G., "Handbook of Electrochemistry," First Edition, 2007, Las Cruces, New Mexico, USA, Elsevier B. V., 935 pages.
Notice of Reason for Rejection for Japanese Patent Application No. 2014-548972, dated Feb. 7, 2017, 5 pages.
Notice of Allowance for U.S. Appl. No. 14/382,463, dated Apr. 6, 2017, 7 pages.
Notice of Reasons for Rejection for Japanese Patent Application No. 2014-561017, dated Mar. 21, 2017, 10 pages.
Invitation to Pay Additional Fees for International Patent Application No. PCT/US2016/067468, dated Feb. 13, 2017, 2 pages.
Final Office Action for U.S. Appl. No. 13/725,073, dated Oct. 4, 2016, 38 pages.
Third Office Action for Chinese Patent Application No. 201280070343.4, dated Sep. 7, 2016, 25 pages.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Examination Report for European Patent Application No. 12874989.2, dated Jul. 24, 2017, 5 pages.
Communication pursuant to Article 94(3) EPC for European Patent Application No. 13757195.6, dated Jul. 6, 2017, 3 pages.
International Search Report and Written Opinion for International Patent Application No. PCT/US2017/024716, dated Jun. 20, 2017, 13 pages.
Non-Final Office Action for U.S. Appl. No. 13/725,073, dated Aug. 28, 2017, 41 pages.
Second Office Action for Chinese Patent Application No. 201380023699.7, dated Aug. 9, 2017, 8 pages.

(56) References Cited

OTHER PUBLICATIONS

International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
Liu, Wenwen, et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen, et al., "Superior Micro-Supercapacitors Based on Graphene Quantum Dots," Advanced Functional Materials, vol. 23, Issue 33, Mar. 26, 2013, WILEY-VCH Verlag GmbH & Co. KGaA, Weinheim, pp. 4111-4122.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Maiti, Sandipan, et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Oudenhoven, Jos F. M. et al., "All-Solid-State Lithium-Ion Microbatteries: A Review of Various Three-Dimensional Concepts," Advanced Energy Materials, vol. 1, Issue 1, WILEY-VCH Verlag GmbH & Co. KGaA, Weinheim, pp. 10-33.
Patel, Mehul N., et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David, et al, "Ultrahigh-power micrometre-sized supercapacitors based on onion-like carbon," Nature Nanotechnology, vol. 5, Sep. 2010, Macmillan Publishers Limited, 10 pages.
Qiu, Ling, et al., "Controllable Corrugation of Chemically Converted Graphene Sheets in Water and Potential Application for Nanofiltration," Chemical Communications, vol. 47, 2011, pp. 5810-5812.
Shen, Caiwei, et al., "A high-energy-density micro supercapacitor of asymmetric $MnO_2$-carbon configuration by using microfabrication technologies," Journal of Power Sources, vol. 234, Feb. 9, 2013, Elsevier B.V., pp. 302-309.
Simon, Patrice, et al., "Materials for electrochemical capacitors," Nature Materials, vol. 7, Nov. 2008, Macmillan Publishers Limited, pp. 845-854.
Simon, Patrice, et al., "Where Do Batteries End and Supercapacitors Begin?" Science, vol. 343, Issue 6176, Mar. 14, 2014, American Association for the Advancement of Science, 3 pages.
Strong, Veronica, et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin, et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti, et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, WILEY-VCH Verlag GmbH & Co. KGaA, Weinheim, pp. 2809-2815.
Toupin, Mathieu, et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.
Viculis, Lisa M., et al., "A Chemical Route to Carbon Nanoscrolls," Science, vol. 299, Issue 5611, Feb. 28, 2003, American Association for the Advancement of Science, 2 pages.

Wang, Guoping, et al, "A review of electrode materials for electrochemical supercapacitors," Chemical Society Reviews, vol. 41, Jul. 21, 2011, The Royal Society of Chemistry, pp. 797-828.
Wang, Huanlei, et al., "Graphene-Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Xu, et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wassei, Jonathan K., et al., "Oh the Places You'll Go with Graphene", Accounts of Chemical Research, Dec. 20, 2012, Vers. 9, 11 pages.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Jing, et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Yan, Jun, et al., "Fast and reversible surface redox reaction of graphene-MnO2composites as supercapacitor electrodes," Carbon, vol. 48, Issue 13, Jun. 25, 2010, Elsevier Ltd., pp. 3825-3833.
Yang, Peihua, et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei, et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yu, Guihua, et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Zhang, Yonglai, et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye, et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, WILEY-VCH Verlag GmbH & Co. KGaA, Weinheim, pp. 1-9.
Zhao, Xin, et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia, et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhu, Yanwu, et al., "Carbon-Based Supercapacitors Produced by Activation of Graphene," Science, vol. 332, May 12, 2011, www.sciencemag.org, pp. 1537-1541.
Fan, Zhuangjun, et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, WILEY-VCH Verlag GmbH & Co. KGaA, Weinheim, pp. 2366-2375.
Non-Final Office Action for U.S. Appl. No. 13/725,073, dated Apr. 15, 2016, 32 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Extended European Search Report for European Patent Application No. 12874989.2, dated Jun. 17, 2015, 6 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Extended European Search Report for European Patent Application No. 13757195.6, dated Jul. 1, 2015, 9 pages.

(56) References Cited

OTHER PUBLICATIONS

International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/061400, dated Mar. 29, 2016, 20 pages.
Third Office Action and Search Report for Chinese Patent Application No. 201380023699.7, dated Mar. 9, 2018, 16 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Non-Final Office Action for U.S. Appl. No. 15/319,286, dated Jun. 27, 2018, 9 pages.
Non-Final Office Action for U.S. Appl. No. 15/382,871, dated Jun. 27, 2018, 11 pages.
Non-Final Office Action for U.S. Appl. No. 15/472,409, dated Jun. 29, 2018, 11 pages.
International Search Report and Written Opinion for International Patent Application No. PCT/US2017/048883, dated Dec. 26, 2017, 10 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Decision to Grant a Patent for Japanese Patent Application No. 2014-561017, dated Mar. 13, 2018, 4 pages.
Examination Report for European Patent Application No. 13757195.6, dated Jun. 13, 2018, 7 pages.
Partial Supplementary European Search Report for European Patent Application No. 15861794.4, dated Jun. 28, 2018, 16 pages.
International Preliminary Report on Patentability for International Patent Application No. PCT/US2016/067468, dated Jul. 5, 2018, 7 pages.
Non-Final Office Action for U.S. Appl. No. 15/612,405, dated Feb. 9, 2018, 9 pages.
First Office Action for Canadian Patent Application No. 2,862,806, dated Nov. 22, 2018, 5 pages.
Notification of the First Office Action for Chinese Patent Application No. 201580043429.1, dated Oct. 29, 2018, 19 pages.
International Search Report and Written Opinion for International Patent Application No. PCT/US2018/041728, dated Nov. 9, 2018, 10 pages.
Corrected Notice of Allowability for U.S. Appl. No. 15/319,286, dated Nov. 30, 2018, 5 pages.
Notification of the First Office Action for Chinese Patent Application No. 201580072540.3, dated Jun. 25, 2018, 14 pages.
International Preliminary Report on Patentability for International Patent Application No. PCT/US2017/014126, dated Aug. 2, 2018, 10 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
Notice of Allowance for U.S. Appl. No. 15/319,286, dated Oct. 1, 2018, 8 pages.
Corrected Notice of Allowability for U.S. Appl. No. 15/319,286, dated Oct. 29, 2018, 5 pages.
Non-Final Office Action for U.S. Appl. No. 15/410,404, dated Sep. 27, 2018, 9 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Non-Final Office Action for U.S. Appl. No. 16/029,930, dated Apr. 3, 2019, 13 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Examination Report No. 1 for Australian Patent Application No. 2015277264, dated Mar. 7, 2019, 4 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Examination Report for European Patent Application No. 12874989.2, dated Mar. 5, 2019, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Corrected Notice of Allowability for U.S. Appl. No. 15/319,286, dated Jan. 18, 2019, 5 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Non-Final Office Action for U.S. Appl. No. 15/427,210, dated Feb. 28, 2019, 17 pages.
Examination Report No. 1 for Australian Patent Application No. 2015349949, dated Mar. 8, 2019, 4 pages.
Final Office Action for U.S. Appl. No. 15/382,871, dated Jan. 25, 2019, 16 pages.
Final Office Action for U.S. Appl. No. 15/410,404, dated Feb. 21, 2019, 9 pages.
Final Office Action for U.S. Appl. No. 15/472,409, dated Jan. 18, 2019, 12 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Notice of Reexamination for Chinese Patent Application No. 201280070343.4, dated Jun. 27, 2019, 14 pages.
Notification of the Second Office Action for Chinese Patent Application No. 201580043429.1, dated Jun. 20, 2019, 9 pages.
Notice of Acceptance for Australian Patent Application No. 2015349949, dated Jul. 12, 2019, 3 pages.
Extended European Search Report for European Patent Application No. 16879927.8, dated Jul. 9, 2019, 14 pages.
Partial Supplementary European Search Report for European Patent Application No. 17741923.1, dated Jul. 23, 2019, 13 pages.
Applicant-Initiated Interview Summary for U.S. Appl. No. 15/427,210, dated May 29, 2019, 3 pages.
Non-Final Office Action for U.S. Appl. No. 15/466,425, dated Jul. 10, 2019, 8 pages.

(56) References Cited

OTHER PUBLICATIONS

Non-Final Office Action for U.S. Appl. No. 15/612,405, dated Jun. 18, 2019, 12 pages.
Notice of Allowance for U.S. Appl. No. 15/382,871, dated May 17, 2019, 10 pages.
Non-Final Office Action for U.S. Appl. No. 15/410,404, dated May 24, 2019, 9 pages.
Non-Final Office Action for U.S. Appl. No. 15/472,409, dated May 31, 2019, 12 pages.
Notice of Preliminary Rejection for Korean Patent Application No. 10-2014-7028084, dated Aug. 22, 2019, 30 pages.
Notice of Acceptance for Australian Patent Application No. 2015277264, dated Jul. 31, 2019, 3 pages.
Notification of the Third Office Action for Chinese Patent Application No. 201580072540.3, dated Jul. 17, 2019, 9 pages.
Notification of Reasons for Rejection for Japanese Patent Application No. 2017-526533, dated Aug. 20, 2019, 4 pages.
Cannarella et al., "Mechanical Properties of a Battery Separator under Compression and Tension," Journal of the Electrochemical Society, vol. 161, No. 11, Sep. 26, 2014, pp. F3117-F3122.
Non-Final Office Action for U.S. Appl. No. 15/427,210, dated Sep. 3, 2019, 16 pages.
Applicant-Initiated Interview Summary for U.S. Appl. No. 16/029,930, dated Jul. 29, 2019, 4 pages.
Non-Final Office Action for U.S. Appl. No. 15/382,871, dated Sep. 16, 2019, 9 pages.
Non-Final Office Action for U.S. Appl. No. 16/428,409, dated Sep. 16, 2019, 12 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.
Extended European Search Report for European Patent Application No. 17776536.9, dated Oct. 30, 2019, 8 pages.
Extended European Search Report for European Patent Application No. 17771081.1, dated Oct. 22, 2019, 6 pages.
Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Lu, J. et al., "Advanced applications of ionic liquids in polymer science," Progress in Polymer Science, vol. 34, 2009, Elsevier Ltd., pp. 431-448.
Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Notice of Allowance and Examiner-Initiated Interview Summary for U.S. Appl. No. 15/410,404, dated Oct. 25, 2019, 11 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Applicant-Initiated Interview Summary for U.S. Appl. No. 15/466,425, dated Oct. 22, 2019, 3 pages.
U.S. Appl. No. 15/427,210, filed Feb. 8, 2017.
U.S. Appl. No. 15/319,286, filed Dec. 15, 2016.
U.S. Appl. No. 15/382,871, filed Dec. 19, 2016.
U.S. Appl. No. 15/410,404, filed Jan. 19, 2017.
U.S. Appl. No. 15/472,409, filed Mar. 29, 2017.
U.S. Appl. No. 15/466,425, filed Mar. 22, 2017.
Vranes, M. et al., "Physicochemical Characterization of 1-Butyl-3-methylimidazolium and 1-Butyl-1-methylpyrrolidinium Bis{trifluoromethylsulfonyl}imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Final Office Action for U.S. Appl. No. 15/612,405, dated Dec. 27, 2019, 17 pages.
Applicant-Initiated Interview Summary for U.S. Appl. No. 15/382,871, dated Dec. 31, 2019, 5 pages.
Corrected Notice of Allowability for U.S. Appl. No. 15/410,404, dated Dec. 3, 2019, 6 pages.
Non-Final Office Action for U.S. Appl. No. 16/692,123, dated Dec. 27, 2019, 11 pages.
Notice of Allowance for U.S. Appl. No. 15/472,409, dated Dec. 11, 2019, 11 pages.
Gao, C. et al., "Superior Cycling Performance of SiOx/C Composite with Arrayed Mesoporous Architecture as Anode Material for Lithium-Ion Batteries," Journal of the Electrochemical Society, vol. 161, No. 14, 2014, The Electrochemical Society, pp. A2216-A2221.
Grant of Patent for Korean Patent Application No. 10-2014-7020353, dated Oct. 29, 2019, 3 pages.
Office Action for Canadian Patent Application No. 2,866,250, dated Dec. 17, 2019, 3 pages.
Examination Report for European Patent Application No. 15809519.0, dated Dec. 9, 2019, 7 pages.
Official Action for Eurasian Patent Application No. 201791078, dated Nov. 6, 2019, 4 pages.
Official Action for Eurasian Patent Application No. 201892199, dated Nov. 28, 2019, 6 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.
Final Office Action for U.S. Appl. No. 15/466,425, dated Jan. 28, 2020, 8 pages.
Examination Report for European Patent Application No. 13757195.6, dated Jan. 29, 2020, 4 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Office Action for Israeli Patent Application No. 249506, dated Dec. 3, 2019, 8 pages.
Office Action for Brazilian Patent Application No. 112017010257, dated Jan. 28, 2020, 7 pages.
First Office Action for Chinese Patent Application No. 2017800076125, dated Nov. 28, 2019, 20 pages.
International Preliminary Report on Patentability for International Patent Application No. PCT/US2018/041728, dated Jan. 23, 2020, 7 pages.
Notice of Reexamination for Chinese Patent Application No. 201280070343.4, dated Feb. 3, 2020, 7 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Office Action for Mexican Patent Application No. MX/a/2016/016239, dated Feb. 26, 2020, 5 pages.
Second Office Action for Chinese Patent Application No. 2016800753323, dated Mar. 5, 2020, 15 pages.
First Office Action for Chinese Patent Application No. 2017/800249783, dated Jan. 6, 2020, 15 pages.
Author Unknown, "Sulfric Acid-Density,"The Engineering Toolbox, accessed Apr. 10, 2020 at https://www.engneeringtoolbox.com/indiesulferic-acid-density-d_2163.html, 6 pages.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Kang, J.H et al., "Hidden Second Ocidation Step of Hummers Method,"Chemistry of Materials, vol. 28, 2016, American Chemical Society, pp. 6301-6311.

(56) References Cited

OTHER PUBLICATIONS

Li, Qinato et al., "Carbon nanotubes coated by carbon nanoparticles of turbostratic stacked graphenes,"arbon, vol. 46, 2008, Elsevier Ltd., pp. 434-439.
Non-Final Office Action for U.S. Appl. No. 15/688,342, dated Apr. 9, 2020, 10 pages.
Final Office Action for U.S. Appl. No. 15/630,758, dated Apr. 15, 2020, 13 pages.
Non-Final Office Action for U.S. Appl. No. 16/033,266, dated Apr. 29, 2020, 12 pages.
Examination Report No. 1 for Australian Patent Application No. 2019250120, dated Apr. 24, 2020, 4 pages.
Notification of Reasons for Rejection for Japanese Patent Application No. 2017-526533, dated Mar. 16, 2020, 7 pages.
Office Action for Eurasian Patent Application No. 201990587/31, dated Mar. 26, 2020, 4 pages.
Partial Supplemental European Search Report for European Patent Application No. 17847303.9, dated Apr. 3, 2020, 10 pages.
Decision of Rejection for Chinese Patent Application No. 201580072540.3, dated Apr. 22, 2020, 8 pages.

* cited by examiner

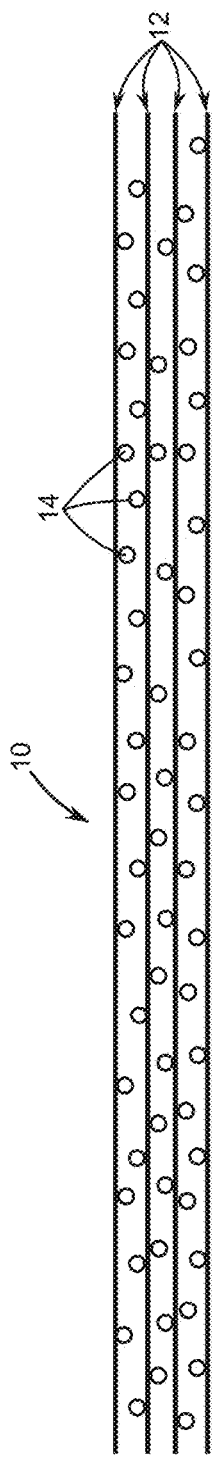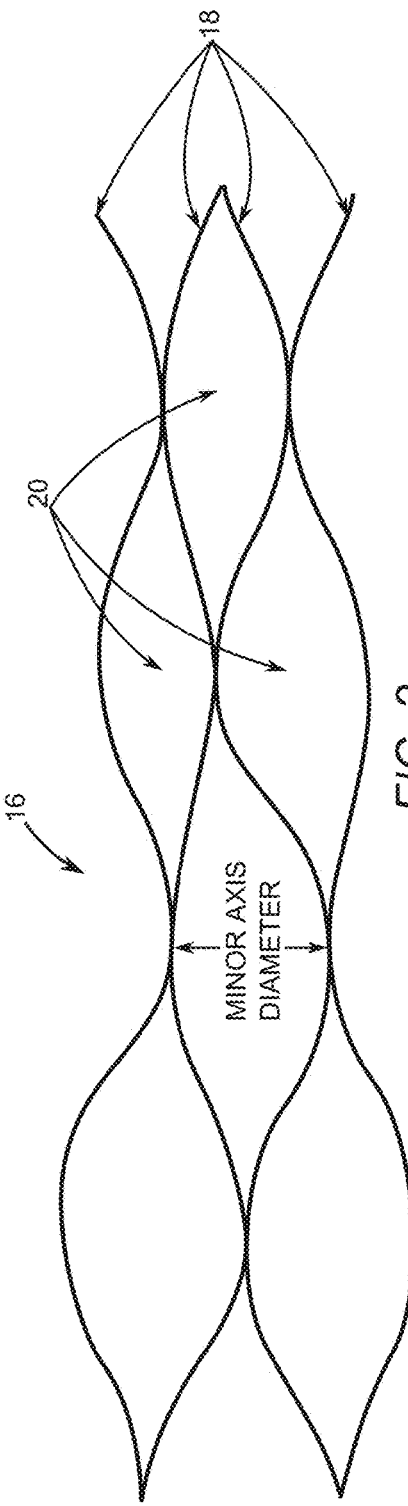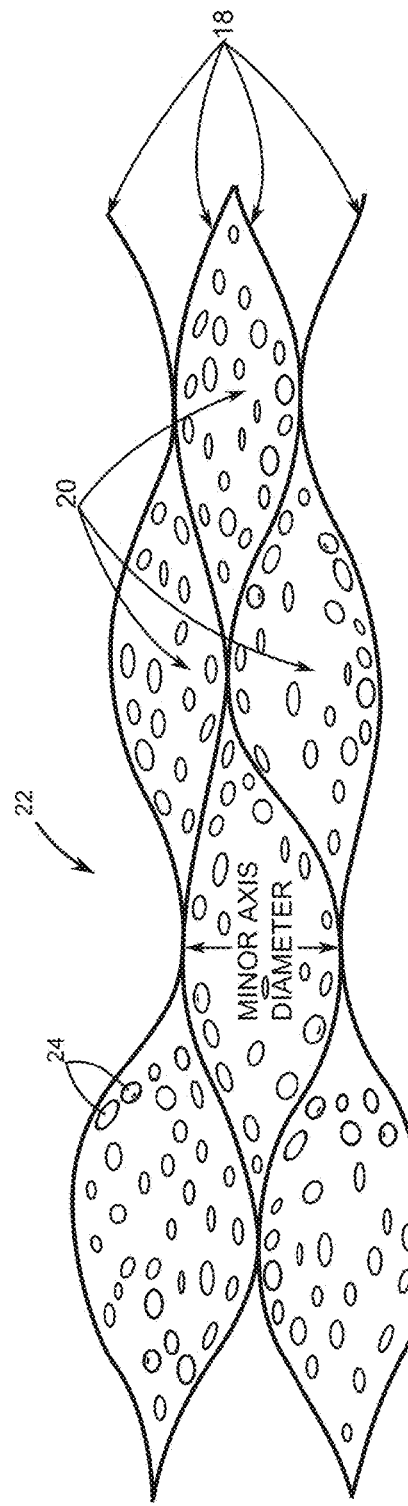

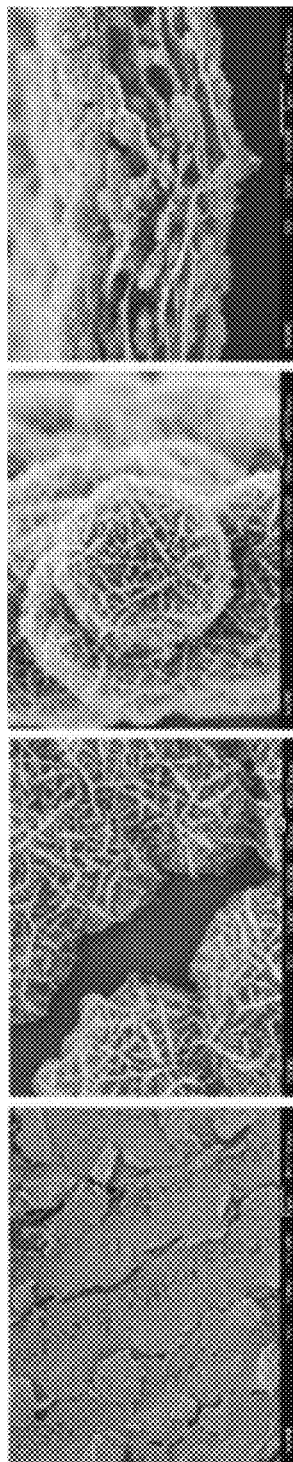

POROUS INTERCONNECTED CORRUGATED CARBON-BASED NETWORK (ICCN) COMPOSITE

RELATED APPLICATIONS

This application claims the benefit of U.S. provisional patent application No. 62/081,237, filed Nov. 18, 2014, the disclosure of which is incorporated herein by reference in its entirety.

FIELD OF THE DISCLOSURE

The present disclosure relates to a porous interconnected corrugated carbon-based network (ICCN) composite having increased energy density and increased power density.

BACKGROUND

Electrochemical capacitors offer significant advantages compared to conventional storage media, such as batteries and capacitors, provide significantly higher energy densities than conventional capacitors, and exhibit higher power and longer cycle life than batteries. Electrochemical capacitors can be separated into two general categories: electrical double layer capacitors (EDLCs) and pseudocapacitors. EDLCs store electrostatic charge at the interface between the electrode and electrolyte, where the charge accumulates on the electrode surface. The most important attributes of an EDLC electrode are high surface area and high porosity, as the amount of charge accumulation is related to exposed surface area.

Recent advances in carbon materials such as carbon nanotubes, two-dimensional one atom thick carbon sheets, and activated carbon (AC) have led to their use as the active material in EDLCs. Two-dimensional one atom thick carbon sheets are one of the most attractive materials for such applications, owing to their remarkably high surface area, excellent electrical and thermal conductivity, electrochemical stability, and mechanical properties. While carbon-based EDLCs can provide a theoretical capacitance up to 550 Farads per gram, this falls short for many practical applications, particularly when compared to electrochemical batteries. Pseudocapacitors, which are based on redox reactions of the electrode material, can have up to 10 times higher capacitance than EDLCs, yet their wide-spread applications have been limited due to lower power density and poor cycling stability.

In pseudocapacitors, only surface and near-surface sites can contribute to charge storage via redox reactions, where the electrode materials are commonly used metal oxides or conducting polymers. Among the metal oxides, ruthenium oxide ($RuO_2$) has been widely studied as a material for pseudocapacitor applications due to its remarkably high specific capacitance (1300-2200 Farads per gram), highly reversible charge-discharge features, wide potential window, and high electrical conductivity ($10^5$ siemens per centimeter). For practical applications of $RuO_2$ as a pseudocapacitor electrode, power density and cycle life must be improved.

SUMMARY

A porous interconnected corrugated carbon-based network (ICCN) composite and methods for making the same are disclosed. The porous ICCN composite is made up of a plurality of carbon layers that are interconnected and expanded apart from one another to form a plurality of pores. Metallic nanoparticles are disposed within the plurality of pores.

The inventors have focused on developing a hybrid system in which the merits of EDLCs and pseudocapacitors are combined to overcome the shortcomings of each individual technology. Such hybrid electrochemical capacitors disclosed herein offer improved energy and power densities, as well as improved cycling stability. The inventors have identified that carbon-metal oxide nanocomposites with high electrical conductivities are of interest as electrodes for hybrid electrochemical capacitors with the proposition that they will benefit from the electrical conductivity of carbon and the high capacitance of metal oxides, thus providing systems with both higher energy density and higher power density.

The inventors have also identified a method for minimizing the number of steps in the preparation of an electrochemical capacitor, including, for example, limiting the necessary number of post-processing steps, and thereby maximizing the potential of these methods for practical scale-up application in industry.

Small-scale supercapacitors, referred to as microsupercapacitors, have emerged as promising energy sources for powering microelectronics. The inventors have identified applications of carbon-based/$RuO_2$ electrodes in micro-supercapacitors that extend beyond the conventional parallel plate supercapacitors, for example, uses of carbon-based electrodes, such as carbon-based/$RuO_2$ electrodes, in miniature interdigitated supercapacitor applications. This significant advancement avoids the difficulties characteristic of fabricating and processing hybrid materials into patterned microelectrodes.

Certain desirable features of the carbon materials that are useful for the applications described herein include high surface area, controlled porosity and ease of processing into electrodes. The combination of carbon with metal oxides results in hybrid electrodes with a higher specific capacitance compared to pure carbon electrodes, which has so far limited the energy density of supercapacitors currently available commercially. The subject matter described herein also provides for the preparation and processing of carbon/metal oxide electrodes into supercapacitors of different structures and configurations, especially for miniaturized electronics, in a manner that avoids many of the challenges that are incumbent upon traditional preparation and manufacturing processes. The inventors have identified, and herein describe, a composite material that is usable to construct electrodes for energy storage devices having increased energy density and increased power density and commercially scalable methods for producing the composite material.

In one aspect, described herein is a porous interconnected corrugated carbon-based network (ICCN) composite comprising: a plurality of carbon layers that are interconnected and expanded apart from one another to form a plurality of pores; and metallic nanoparticles disposed within the plurality of pores. In some embodiments, the porous ICCN has an average minor axis diameter of the plurality of pores that ranges from about 2 nanometers to about 550 nanometers. In some embodiments, the porous ICCN has an average minor axis diameter of the plurality of pores that ranges from about 10 nanometers to about 450 nanometers, or from about 25 nanometers to about 400 nanometers, or from about 50 nanometers to about 350 nanometers, or from about 75 nanometers to about 300 nanometers, or from about 100 nanometers to about 250 nanometers. In some embodiments, the range is from about 50 nanometers to about 500 nanometers.

In some embodiments, provided is a porous ICCN composite wherein the metallic nanoparticles have a nanoflower shape. In certain applications, the metallic nanoparticles are metal particles. In still further or additional embodiments, the metallic nanoparticles are metal oxide particles. In some embodiments, the metallic nanoparticles are particles of manganese dioxide ($MnO_2$), ruthenium dioxide ($RuO_2$), cobalt oxide ($Co_3O_4$), nickel oxide (NiO), iron oxide ($Fe_2O_3$), copper oxide (CuO), molybdenum trioxide ($MoO_3$), vanadium pentoxide ($V_2O_5$), nickel hydroxide (Ni$(OH)_2$), or a combination of one or more thereof.

In another aspect, provided is a porous ICCN composite wherein an electrical conductivity of the plurality of carbon layers is greater than about 0.1 siemens/meter. In some embodiments, the porous ICCN composite has an electrical conductivity that ranges from about 900 siemens/meter to about 1750 siemens/meter. In some embodiments, the provided is a porous ICCN composite has an electrical conductivity that is greater than about 0.5 siemens/meter, or greater than about 1 siemens/meter, or greater than about 5 siemens/meter, or greater than about 10 siemens/meter, or greater than about 15 siemens/meter, or greater than about 25 siemens/meter, or greater than about 50 siemens/meter, or greater than about 100 siemens/meter, or greater than about 200 siemens/meter, or greater than about 300 siemens/meter, or greater than about 400 siemens/meter, or greater than about 500 siemens/meter, or greater than about 600 siemens/meter, or greater than about 700 siemens/meter, or greater than about 800 siemens/meter, or greater than about 900 siemens/meter, or greater than about 1,000 siemens/meter, or greater than about 1,100 siemens/meter, or greater than about 1,200 siemens/meter, or greater than about 1,300 siemens/meter, or greater than about 1,400 siemens/meter, or greater than about 1,500 siemens/meter, or greater than about 1600 siemens/meter, or greater than about 1,700 siemens/meter.

Another aspect of the subject matter described herein is a porous ICCN composite wherein a total surface area per unit mass of the plurality of carbon layers is at least about 1,500 square meters per gram, or at least about 2,000 square meters per gram, or at least about 3,000 square meters per gram, or at least about 4,000 square meters per gram, or at least about 5,000 square meters per gram, or at least about 10,000 square meters per gram, or at least about 15,000 square meters per gram, or at least about 25,000 square meters per gram.

Yet another aspect of the subject matter described herein is a porous ICCN composite wherein a percentage of surface area coverage of the metallic nanoparticles onto the plurality of carbon layers ranges from about 10% to about 95%. In some embodiments, the percentage of surface area coverage of the metallic nanoparticles onto the plurality of carbon layers is at least about 15%, or is at least about 20%, or is at least about 25%, or is at least about 30%, or is at least about 35%, or is at least about 40%, or is at least about 45%, or is at least about 50%, or is at least about 60%, or is at least about 70%, or is at least about 80%, or is at least about 90%, or is at least about 95%.

Another aspect of the subject matter described herein is a porous ICCN composite wherein the porous ICCN composite provides an energy density that ranges from about 2 Watt-hour/liter to about 41 Watt-hour/liter. In certain embodiments, the porous ICCN composite provides an energy density that is at least about 2 Watt-hour/liter, or at least about 5 Watt-hour/liter, or at least about 10 Watt-hour/liter, or at least about 15 Watt-hour/liter, or at least about 20 Watt-hour/liter, or at least about 25 Watt-hour/liter, or at least about 30 Watt-hour/liter, or at least about 35 Watt-hour/liter, or at least about 40 Watt-hour/liter.

Additional aspects of the subject matter described are methods of producing porous ICCN composite. For example, in one embodiment, the method comprises: providing a film comprising a mixture of a metallic precursor and a carbon-based oxide; and exposing at least a portion of the film to light to form a porous interconnected corrugated carbon-based network (ICCN) composite comprising: a plurality of carbon layers that are interconnected and expanded apart from one another to form a plurality of pores; and metallic nanoparticles disposed within the plurality of pores, wherein the light converts the metallic precursor to the metallic nanoparticles. In further or additional embodiments, provided is a method of producing porous ICCN composite wherein providing the film made of the mixture of the metallic precursor and the carbon-based oxide comprises: providing a solution comprising a liquid, the metallic precursor, and the carbon-based oxide; disposing the solution with the liquid, the metallic precursor, and the carbon-based oxide onto a substrate; and evaporating the liquid from the solution to form the film. In one embodiment, provided is a method of producing porous interconnected corrugated carbon-based network (ICCN) composite comprising: forming a porous ICCN comprising a plurality of carbon layers that are interconnected and expanded apart from one another to form a plurality of pores; and electrodepositing metallic nanoparticles within the plurality of pores. In another embodiment, the method comprises providing a film made of the mixture of the metallic precursor and the carbon-based oxide that comprises: providing a solution comprising a liquid, the metallic precursor, and the carbon-based oxide; disposing the solution with the liquid, the metallic precursor, and the carbon-based oxide onto a substrate; and evaporating the liquid from the solution to form the film. In certain applications, the carbon-based oxide is graphite oxide.

In another aspect, methods for electrodepositing the metallic nanoparticles within the plurality of pores comprise: submerging the porous ICCN into an aqueous solution having a metal precursor; and applying an electrical current through the porous ICCN to electrodeposit the metallic nanoparticles into the plurality of pores. In some embodiments, the electrical current has a current density of at least about 250 microamperes per square centimeter. In some embodiments, the electrical current has a current density of at least about 350 microamperes per square centimeter, or at least about 450 microamperes per square centimeter, or at least about 550 microamperes per square centimeter, or at least at least about 650 microamperes per square centimeter, or at least about 750 microamperes per square centimeter, or at least about 1,000 microamperes per square centimeter.

In an exemplary embodiment, a light exposure only method for producing a porous ICCN composite is disclosed. In another exemplary embodiment, a light exposure plus an electrodeposition method for producing the porous ICCN composite is disclosed. In yet another exemplary embodiment, a capacitor having a first electrode and a second electrode separated from the first electrode by a dielectric wherein at least one of the first electrode and the second electrode is formed from the porous ICCN composite is disclosed.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 depicts a cross-section of a carbon-based oxide flake.

FIG. 2 depicts a cross-section of a porous interconnected corrugated carbon-based network (ICCN) that results from deoxygenating the carbon-based oxide flake of FIG. 1.

FIG. 3 depicts a cross-section of a porous ICCN composite that include metallic nanoparticles disposed within pores of the porous ICCN of FIG. 2.

FIG. 5B' is a top view depicting the interdigitated electrodes depicted in FIG. 5A.

FIG. 7A is an SEM image of a portion of an electrode comprising porous ICCN composite.

FIG. 7B is a higher magnification of the SEM image of FIG. 7A.

FIG. 7C is an SEM image of a nanoflower morphology of electrodeposited $MnO_2$.

FIG. 7D is a cross-sectional SEM image of porous ICCN composite.

DETAILED DESCRIPTION

Figure 4:
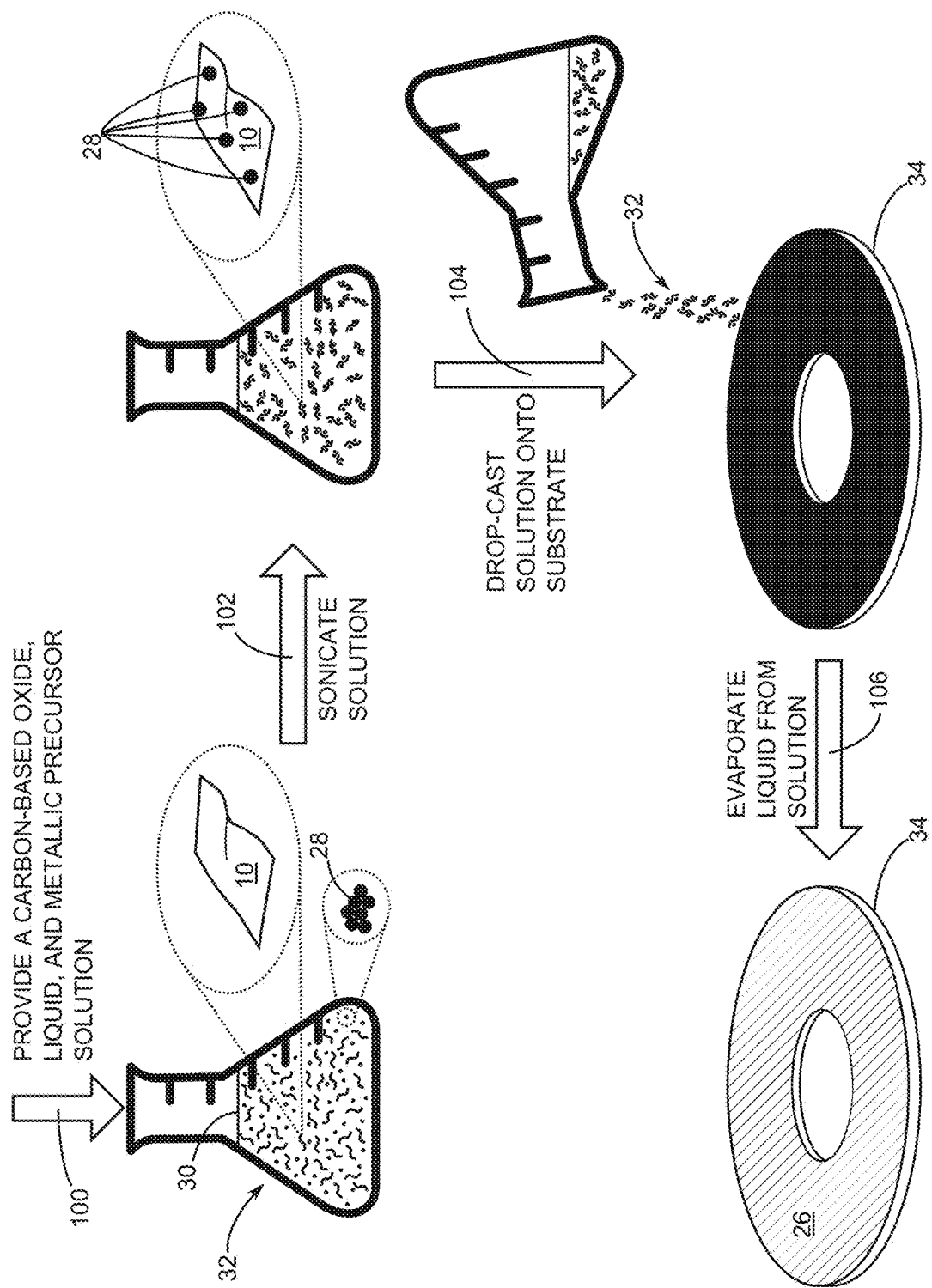
FIG. 4 depicts a process for making a carbon-based film composite that contains carbon-based oxide flakes and a metallic precursor.

The embodiments set forth below enable those skilled in the art to practice the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that when an element such as a layer, region, or substrate is referred to as being "over," "on," "in," or extending "onto" another element, it can be directly over, directly on, directly in, or extend directly onto the other element or intervening elements may also be present. In contrast, when an element is referred to as being "directly over," "directly on," "directly in," or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

For the purpose of this disclosure, in certain embodiments, the term expanded referring to a plurality of carbon layers that are expanded apart from one another means that the a portion of adjacent ones of the carbon layers are separated by at least 2 nanometers. Moreover, for the purpose of this disclosure, in certain embodiments the plurality of carbon layers is also defined as having an electrical conductivity greater than about 0.1 siemens/meter. Further still, each of the plurality of carbon layers is defined as being a two-dimensional material with only one carbon atom of thickness.

FIG. 1 depicts a cross-section of a flake of a carbon-based oxide 10 having a plurality of one atom thick carbon sheets 12. Oxygen atoms 14 are located between each of the plurality of one atom thick carbon sheets 12. A suitable material for the carbon-based oxide 10 is typically referred to as graphite oxide. Directing light having a power ranging from around about 5 milliwatts to around about 350 milliwatts causes the oxygen atoms to combine with some carbon atoms to form carbon dioxide gas that forces the plurality of one atom thick carbon sheets 12 to separate at locations. The carbon dioxide gas escapes from the carbon-based oxide 10 thereby deoxygenating the carbon-based oxide 10.

FIG. 2 depicts a cross-section of a porous interconnected corrugated carbon-based network (ICCN) 16 that results from deoxygenating the carbon-based oxide 10 of FIG. 1. The porous ICCN 16 comprises a plurality of expanded and interconnected carbon layers 18 that are interconnected and expanded apart from one another to form a plurality of pores 20. An average minor axis diameter of the plurality of pores 20 ranges between 2 nanometers and 550 nanometers. In an exemplary embodiment, the average minor axis diameter ranges between 50 nanometers and 500 nanometers.

FIG. 3 depicts a cross-section of a porous ICCN composite 22 that include metallic nanoparticles 24 disposed within the plurality of pores 20. The metallic nanoparticles 24 can be but are not limited to particles of manganese dioxide ($MnO_2$), ruthenium dioxide ($RuO_2$), cobalt oxide ($Co_3O_4$), nickel oxide (NiO), iron oxide ($Fe_2O_3$), copper oxide (CuO), molybdenum trioxide ($MoO_3$), vanadium pentoxide ($V_2O_5$), nickel hydroxide ($Ni(OH)_2$), and combinations thereof. In yet other embodiments, the metallic nanoparticles are metal particles that include but are not limited to platinum (Pt), palladium (Pd), silver (Ag), gold (Au) and combinations thereof. Moreover, in at least some embodiments, the metallic nanoparticles have shapes that include but are not limited to nanoflower shapes, flake shapes and combinations thereof.

In at least one embodiment the porous ICCN composite 22 has an electrical conductivity greater than 900 siemens/meter. Moreover, a total surface area per unit mass of the plurality of expanded and interconnected carbon layers 18 is ranges between 1500 square meters per gram and 1620 square meters per gram. Further still, a percentage of surface area coverage of the metallic nanoparticles 24 onto the plurality of expanded and interconnected carbon layers 18 ranges between about 50% and 95%.

The porous ICCN composite 22, when charged in a capacitor configuration, provides an energy density that ranges between 2 Watt-hour/liter and 41 Watt-hour/liter. In at least some embodiments, the porous ICCN composite 22 when charged in a capacitor configuration provides an energy density that ranges between 2 Watt-hour/liter and 20 Watt-hour/liter. In yet other embodiments, the porous ICCN composite 22, when charged in a capacitor configuration, provides an energy density that ranges between 20 Watt-hour/liter and 41 Watt-hour/liter.

FIG. 4 depicts a process for making a film 26 of carbon-based composite that contains the carbon-based oxide 10 (FIG. 1) and a metallic precursor 28. The metallic precursor 28 can be but is not limited to ruthenium chloride hydrate ($RuCl_3$), cobalt chloride ($CoCl_2$), nickel chloride ($NiCl_2$), vanadium chloride ($VCl_3$), iron chloride ($FeCl_3$), copper chloride ($CuCl_2$), molybdenum chloride ($MoCl_3$), hydrogen hexachloroplatinate ($H_2PtCl_6$), hexachloropalladate ($H_2PdCl_6$), hydrogen tetrachloroaurate ($HAuCl_4$), and combinations thereof.

The process begins with providing the carbon-based oxide 10, a liquid 30, and metallic precursor 28 in solution 32 (step 100). The process continues by sonicating the solution 32 to increase dispersion and suspension of the metallic precursor 28 and the carbon-based oxide 10 (step 102). After sonication, the metallic precursor 28 is dispersed directly onto the carbon-based oxide 10. The process continues with drop-casting the solution onto a substrate 34 (step 104). Next, a step of evaporating the liquid 30 from the solution 32 is commenced (step 106). Evaporation of the liquid 30 can be forced drying using heat and airflow or natural drying in a relatively lower humidity environment. In at least one embodiment, the liquid 30 is deionized water.

Figure 5:
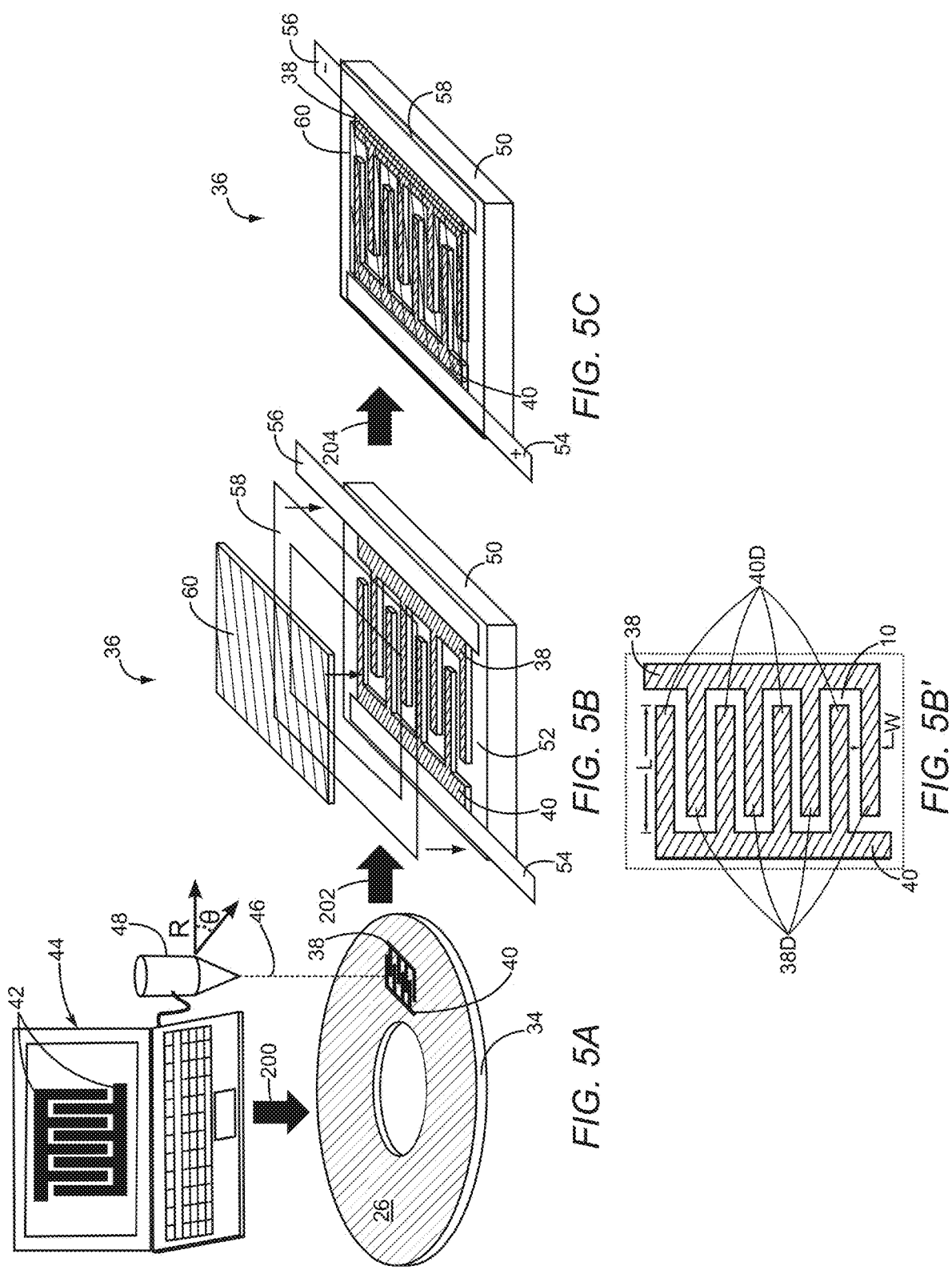
FIG. 5A depicts interdigitated electrodes formed using a computer directed laser to reduce portions of the carbon-based film composite of FIG. 4 into electrode patterns made of the porous ICCN composite of FIG. 3.
FIG. 5B is an exploded depiction of a micro-supercapacitor fabricated using the interdigitated electrodes depicted being formed in FIG. 5A.
FIG. 5C is an isometric view depicting the micro-supercapacitor of FIG. 5B fully assembled.

FIGS. 5A-5C depict an exemplary process for fabricating a micro-supercapacitor 36 having a first electrode 38 and a second electrode 40 made from the porous ICCN composite 22 of FIG. 3. Electrode patterns 42 designed on a computer 44 can be patterned into the film 26 of carbon-based composite on the substrate 34 by using light to reduce portions of the film 26 of carbon-based composite into the first electrode 38 and the second electrode 40. The exemplary process begins when the computer 44 controls positioning and power of light 46 output from a light source 48 such that portions of the film 26 absorb the light 46 and are converted into porous ICCN composite(s) to realize the first electrode 38 and the second electrode 40 (step 200).

In this exemplary embodiment, the light source 48 is a laser diode that is positioned by the computer 44 radially along a radial path R and an arcuate path Θ. By using the precision of a laser, a direct-to-disc labeling drive is usable to render computer-designed patterns such as the electrode patterns 42 into the film 26 of carbon-based composite to produce the first electrode 38 and the second electrode 40. The precision control of the light source 48 afforded by the computer 44 allows the first electrode 38 and the second electrode 40 to be interdigitated. The first electrode 38 and the second electrode 40 are transferred to a package substrate 50 as shown in FIG. 5B.

As best seen from a top view in FIG. 5B', the carbon-based oxide 10 serves as a good insulator between the first electrode 38 with electrode digits 38D and the second electrode 40 with electrode digits 40D. An exemplary length L for the electrode digits 38D and 40D is around 4800 micrometers. An exemplary width W for the electrode digits 38D and 40D is around 1770 micrometers. However, it is to be understood that the dimensions of the first electrode 38 and the second electrode 40 are scalable and only limited at nanoscales by the wavelength of light used to exfoliate the carbon-based oxide 10.

In particular, FIG. 5B shows an exploded view of the micro-supercapacitor 36 comprising the first electrode 38 and a second electrode 40 that are fabricated from porous ICCN composite 22 (FIG. 3) comprising a plurality of expanded and interconnected carbon layers 18 (FIG. 3) that are electrically conductive. The porous ICCN composite 22 has an electrical conductivity that ranges between 900 siemens/meter and about 1738 siemens/meter. Moreover, at least one of the first electrode 38 and the second electrode 40 provides a specific capacitance that ranges between 1100 Farads/gram and 1400 Farads/gram. It is to be understood that optionally either the first electrode 38 or the second electrode 40 can be made of a metal, while the remaining one of either the first electrode 38 or the second electrode 40 is made of porous ICCN composite 22. However, the first electrode 38 and the second electrode 40 are typically laser scribed from the film 26 that is transferred onto the substrate 50 such as Polyethylene terephthalate (PET) or silicon (Si) having an insulating layer 52 such as a silicon dioxide ($SiO_2$) layer.

A first conductive strip 54 and a second conductive strip 56 are interfaced with the first electrode 38 and the second electrode 40 to provide electrically conductive terminals to couple to external circuitry (not shown). Exemplary external circuitry to be powered by the micro-supercapacitor 36 can be, but is not limited to, integrated circuits and other electrically powered micro-scale devices. A liner 58 that is non-electrically conductive covers the portions of the first electrode 38 and the second electrode 40 that are interfaced with the first conductive strip 54 and the second conductive strip 56. The liner 58 includes a central window through which an electrolyte 60 is placed in contact with the first electrode 38 and the second electrode 40. A polyimide tape can be used as the liner 58. The electrolyte is can be a gel electrolyte such as fumed silica (FS) nano-powder mixed with an ionic liquid. An exemplary ionic liquid is 1-butyl-3-methylimidazolium bis(trifluoromethylsulfonyl)imide. Another suitable gel electrolyte is a hydrogel such as poly (vinyl alcohol) (PVA)-$H_2SO_4$. Other electrolytes are also suitable, but the disclosed electrolytes provide a voltage window between a maximum charged voltage and a minimum discharged voltage of around about 2.5V.

FIG. 5C depicts the micro-supercapacitor 36 fully assembled. In this exemplary depiction, the first conductive strip 54 becomes a positive terminal and the second conductive strip 56 becomes a negative terminal. It is to be understood that the first conductive strip 54 and the second conductive strip 56 may be made from an electrical conductor such as copper (Cu), aluminum (Al), and/or additional structures comprised of the porous ICCN composite 22.

The first electrode 38 and the second electrode 40 can thus be directly used as components for planar micro-supercapacitors after receiving an electrolyte overcoat, as depicted in FIGS. 5B and 5C. Unlike conventional micro-fabrication methods, a direct laser scribing technique depicted in FIG. 5A does not require masks, expensive materials, post-processing or clean room operations. Furthermore, the direct laser scribing technique is cost effective and readily scalable.

Between a macro-scale and nano-scale is a sub-micron scale that includes a range of micro-supercapacitors that are usable to power integrated circuits. As such, these micro-supercapacitors can be integrated with integrated circuitry such that the integrated circuitry and micro-supercapacitors can be fabricated into a single integrated circuit package.

The porous ICCN composite 22 of the present disclosure is also usable to fabricate relatively large first and second electrodes separated by an electrolyte that provides enough charge storage capacity to power passenger car sized electric vehicles. Moreover, supercapacitors fabricated in accordance with the present disclosure are also usable to supply electrical power to industrial electrical power grids during peak power demands. For example, the first electrode 38 and the second electrode 40 of a supercapacitor according to the present disclosure can be sized to supply peak power to a megawatt capacity electrical power grid.

Figure 6:
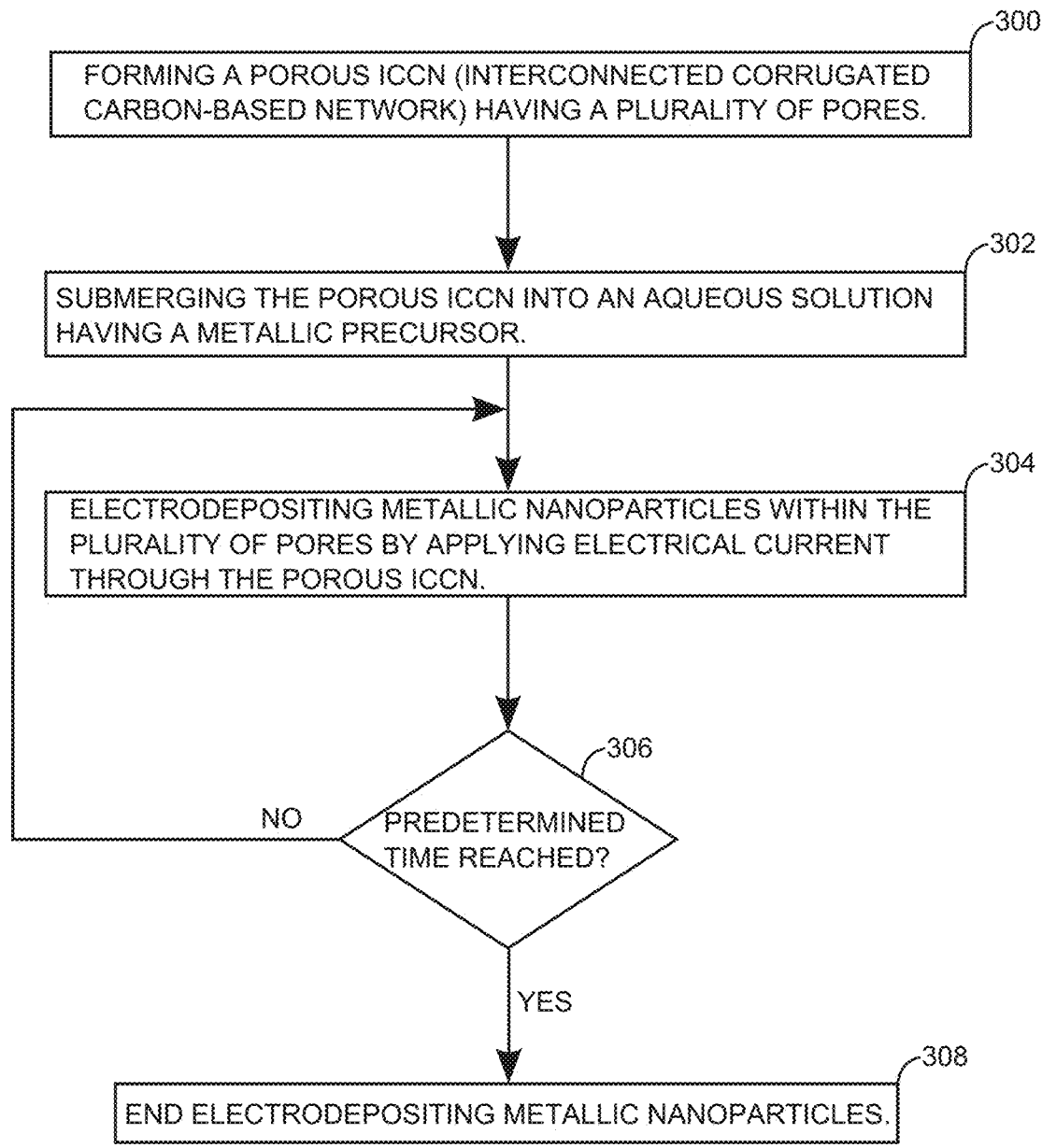
FIG. 6 is a flowchart that depicts an electrodeposition process for adding metallic nanoparticles to the porous ICCN of FIG. 2 to make the porous ICCN composite of FIG. 3.

FIG. 6 is a flowchart that depicts an exemplary electrodeposition process for adding metallic nanoparticles to the porous ICCN 16 (FIG. 2) to make the porous ICCN composite 22 of FIG. 3. The electrodeposition process begins with forming the porous ICCN 16 (step 300). The porous ICCN 16 may be formed by exposing the carbon-based oxide 10 (FIG. 1) to light from the light source 48 (FIG. 5A). While at least one embodiment uses a laser for the light source 48, it is to be understood that a flash lamp as well as other equally high intensity sources of light are usable to reduce the carbon-based oxide to the porous ICCN 16. The electrodeposition process continues by submerging the porous ICCN 16 into an aqueous solution having a metallic precursor 28 (step 302). The porous ICCN 16 is used as a working electrode and electrodepositing metallic nanoparticles 24 with the plurality of pores 20 (FIGS. 2 and 3) is accomplished by applying electrical current through the porous ICCN 16 (step 304). Electrodeposition continues until a predetermined time is reached (step 306) when the electrodeposition is ended (step 308).

In at least one embodiment, the metallic particles electrodeposited in electrodepositing step 304 are manganese dioxide ($MnO_2$) particles. In this case, the metallic precursor is 0.02 molar manganese nitrate ($Mn(NO_3)_2$) in a 0.1 molar sodium nitrate ($NaNO_3$) solution.

In an exemplary embodiment, a standard three electrode electrodeposition setup is usable for the electrodeposition of the metallic nanoparticles. For example, the porous ICCN 16 is used as a working electrode, silver (Ag) or silver chloride (AgCl) is used as a reference electrode, and a platinum foil is used as a counter electrode. An exemplary electrical current applied through the porous ICCN 16 has a current density of around about 250 microamperes per square centimeter. A predetermined time for applying the electrical current in the electrodepositing step (304) is proportional to the amount of metallic nanoparticle deposition desired. The predetermined time ranges from between about 3 minutes to around about 960 minutes. In one embodiment, the predetermined time ranges from 30 minutes to 240 minutes. In another embodiment the predetermined time ranges from 240 minutes to 480 minutes. In yet another embodiment, the predetermined time ranges from 480 minutes to 960 minutes. Within these predetermined time ranges for the electrodepositing step 304, a percentage of surface area coverage of the metallic nanoparticles electrodeposited onto the plurality of expanded and interconnected carbon layers 18 (FIG. 3) within pores 20 ranges from about 10% to around about 95%.

Synthesis and Characterization of 3D Macroporous ICCN/$MnO_2$ Electrodes

To experimentally realize energy dense and high power supercapacitor electrodes, a highly conductive and high surface area 3D laser scribed graphene (LSG) framework that is a form of interconnected corrugated carbon-based network (ICCN) was integrated with $MnO_2$ as schematically illustrated in FIG. 3. The ICCN was produced from the laser scribing of GO films following our previously reported method, upon which the color changes from golden brown to black. The ICCN was subsequently coated in situ with $MnO_2$ using an electrochemical deposition technique as described in the Methods section below. Note that an ICCN electrode turns darker in color after electro-deposition, a visual indication of the loading of $MnO_2$. It is well accepted that the conductivity and mass loading of the active materials have a significant impact on the electrochemical behavior of supercapacitor electrodes. Here, the mass loading of $MnO_2$ is controlled by adjusting the deposition current and deposition time. The $MnO_2$ loading changes almost linearly with the deposition time at an applied current of 0.25 $mA/cm^2$ and an average deposition rate estimated to be ~6 μg/min.

In addition to interesting electrical properties, the ICCN/$MnO_2$ electrodes are monolithic and demonstrate superb mechanical integrity under large mechanical deformation. An ICCN/$MnO_2$ electrode can be bent significantly without damage. The foldability of ICCN/$MnO_2$ electrodes was evaluated by measuring their electrical resistance under successive bending cycles. The resistance varies only slightly up to a bending radius of 5.0 mm and can be completely recovered after straightening no matter whether the bending is positive (convex) or negative (concave). Notably, after 1000 cycles of bending and straightening at a concave bend radius of 5.0 mm, the resistance has increased by only about 2.8%.

The evolution of morphology corresponding to different deposition times was examined by scanning electron microscopy, FIGS. 7A-D. FIG. 7A is an SEM image of a portion of an electrode comprising porous ICCN composite. FIG. 7B is a higher magnification of the SEM image of FIG. 7A. FIG. 7C is an SEM image of a nanoflower of electrodeposited $MnO_2$. FIG. 7D is a cross-sectional SEM image of porous ICCN composite.

The SEM micrographs show the general morphology and detailed microstructure of a typical sample prepared by 120 minutes of deposition. $MnO_2$ has been uniformly coated onto the surface of graphene throughout the entire film. Moreover, the electrodeposited $MnO_2$ particles show a nanoflower-shaped hierarchical architecture with a clear interface between $MnO_2$ and the graphene substrate, which is consistent with previous studies. Closer inspection of the $MnO_2$ nanoflowers shows that they are made up of hundreds of ultrathin nanoflakes that are 10-20 nm thick. These nanoflakes are interconnected together to form mesoporous $MnO_2$ with a large accessible surface area, thus offering numerous electroactive sites available to the electrolyte which promotes fast surface Faradaic reactions.

The 3D structure of ICCN/$MnO_2$ electrodes was further analyzed using cross-sectional SEM, FIG. 7D. The 3D porous structure of ICCN is preserved after the deposition of $MnO_2$ without any agglomerations. The ICCN surface has been uniformly coated with $MnO_2$ over the entire cross-section. In addition, energy-dispersive X-ray spectroscopy (EDS) provides elemental maps of C, O and Mn, which confirms that a homogeneous coating of $MnO_2$ throughout the 3D macroporous framework has been created.

XPS was successfully used for better understanding of the chemical composition and the oxidation state of Mn in the ICCN/$MnO_2$ electrodes. The peaks of Mn $2p_{3/2}$ and Mn $2p_{1/2}$ are located at 642.1 and 653.9 eV, respectively, with a spin energy separation of 11.6 eV, which is in good agreement with data for Mn 2p states previously reported. Toupin et al. showed that the peak separation of the Mn 3s doublet is related to the oxidation state of Mn in manganese oxides, where reference samples of MnO, $Mn_3O_4$, $Mn_2O_3$ and $MnO_2$ showed a separation of 5.79, 5.50, 5.41 and 4.78 eV, respectively. The as-prepared ICCN/$MnO_2$ showed a separation energy of 4.8 eV for the Mn 3s doublet, suggesting that the oxide is $MnO_2$ which was further confirmed from the O 1s spectrum.

Assembly and Electrochemical Performance of Symmetric ICCN/$MnO_2$ Supercapacitors In order to test the electrochemical performance of ICCN/$MnO_2$ macroporous frameworks, a supercapacitor pouch cell was assembled from two symmetric electrodes separated by a Celgard M824 ion porous separator and impregnated with 1.0 M $Na_2SO_4$ electrolyte. The cells were tested by cyclic voltammetry (CV) over a wide range of scan rates from 1 mV/s-1000 mV/s. As an example, consider the ICCN/$MnO_2$ sample with a deposition time of 3 minutes, the supercapacitor shows nearly rectangular CV profiles up to a scan rate as high as 1000 mV/s, indicating excellent charge storage characteristics and ultrafast response time for the electrodes. The capacitances of the devices made with different deposition times were calculated from CV profiles. Note that the capacitance was calculated using the total volume of the cell stack, rather than a single electrode. This includes the volume of the current collector, the active material, the separator and the electrolyte.

The capacitance depends strongly on the loading amount of the pseudo-capacitive $MnO_2$ and increases significantly with deposition time from 0-960 min. For example, a stack capacitance of up to ~203 $F/cm^3$ can be achieved with the sample at a 960 min deposition time. This translates to a volumetric capacitance of 1136.5 $F/cm^3$ when calculated based on the volume of the active material per electrode only. This value is much higher than the capacitance of activated carbons (60-80 $F/cm^3$), carbide-derived carbons (180 $F/cm^3$), bare ICCN (12 $F/cm^3$), activated MEGO (60 $F/cm^3$) and liquid mediated chemically converted graphene (CCG) films (263.3 $F/cm^3$), indicating that the volumetric capacitance of carbon based electrodes can be significantly improved by incorporating pseudo-capacitive materials. Furthermore, this value is higher than some of the best values reported previously for $MnO_2$ based supercapacitors: 16.1 $F/cm^3$ for CNT/PPy/$MnO_2$ sponge, 130 $F/cm^3$ for graphene/$MnO_2$/CNT, 246 $F/cm^3$ for CNT/$MnO_2$, 108 $F/cm^3$ for meso-porous carbon/$MnO_2$ and 90 $F/cm^3$ for ultra-porous carbon/$MnO_2$. In addition, depending on the deposition time, ultrahigh areal capacitances of up to ~0.8 $F/cm^2$ per footprint of the device can be achieved. This compares favorably with commercial carbon supercapacitors that typically provide ~0.3 $F/cm^2$.

This unprecedented performance can be understood by separating the contribution of the $MnO_2$ nanoflowers from the average capacitance of the ICCN/$MnO_2$ electrodes. The specific capacitance contributed by $MnO_2$ alone was calculated by subtracting the charge of the bare ICCN according to the equation $C_{s,MnO2}=(Q_{ICCN/MnO2}-Q_{ICCN})/(\Delta V \times m_{MnO2})$. Here Q is the voltammetric charge, $\Delta V$ is the operating potential window and m is the mass. The specific capacitance of $MnO_2$ depends on the mass of the active material reaching a maximum value of 1145 F/g which is about 83% of the theoretical capacitance at a mass loading of 13% of $MnO_2$. This remarkable performance can be attributed to the electrode microstructure that facilitates the transport of ions and electrons and provides abundant surfaces for charge-transfer reactions, ensuring a greater utilization of the active materials.

In order to demonstrate the superior properties of ICCN/$MnO_2$ macroporous electrodes, $MnO_2$ was also electrodeposited on both chemically converted graphene (CCG) and gold substrates under the same conditions. Not only does the CCG/$MnO_2$ exhibit lower capacitance, but its performance falls off very quickly at higher charge/discharge rates. This can be attributed to the restacking of graphene sheets during the fabrication of the CCG electrodes, resulting in a significant reduction in the surface area and eventually closing off much of the porosity. In addition, the Au/$MnO_2$ supercapacitor shows extremely low capacitance because of the limited surface area and structural properties. ICCN/$MnO_2$, on the other hand, shows a stack capacitance of ~50 $F/cm^3$ that is more than four times higher than CCG/$MnO_2$ and about three orders of magnitude higher than Au/$MnO_2$. The enhanced capacitance and rate capability of the ICCN/$MnO_2$ further confirms its optimized structure which synergizes the effects of both effective ion migration and high electroactive surface area, thus enabling high and reversible capacitive behavior even at high charge/discharge rates. The optimized ionic diffusion of the ICCN network was also confirmed from electrochemical impedance spectroscopy with a response time of 23 ms for ICCN compared to 5952 ms for the CCG electrodes. In fact, the ICCN/$MnO_2$ supercapacitor shows superior volumetric capacitance and rate capability compared to commercially available activated carbon supercapacitors, pseudo-capacitors and lithium ion hybrid capacitors.

Construction of Asymmetric Supercapacitors

Construction of asymmetric supercapacitors. Asymmetric supercapacitors (ASCs) make use of positive and negative electrode materials of different types that can be charged/discharged in well-separated potential windows in the same electrolyte. They have attracted attention because they offer high capacity via a Faradaic reaction at the positive electrode and maintain fast charge/discharge due to the EDL mechanism at the negative electrode. Moreover, the asymmetric configuration can extend the operating voltage window of aqueous electrolytes beyond the thermodynamic limit of water (about 1.2 V), leading to significantly higher specific energy than symmetric supercapacitors using aqueous electrolytes. In fact, asymmetric supercapacitors based on carbon and NiOOH electrodes with an aqueous electrolyte are now commercially available from ESMA-ELTON. However, while this configuration ensures high capacitance, it has a low cell voltage (<1.5 V) that is detrimental to its energy and power performance. Considering the high pseudo-capacitance of the ICCN/$MnO_2$ electrode and the fast charge/discharge of the double layer capacitance of the ICCN electrode, an asymmetric supercapacitor was assembled using ICCN/$MnO_2$ as the positive and ICCN as the negative electrode. Here, a charge balance between the two electrodes was achieved by controlling the deposition time of $MnO_2$ at the positive electrode and the thickness of the graphene film at the negative electrode. The electrochemical performance of an asymmetric cell that uses ICCN/$MnO_2$ with 13% $MnO_2$ mass loading (3 min deposition time) for the positive electrode cell exhibits an ideal capacitive behavior with nearly rectangular CV profiles and highly triangular CC curves. The CV profiles retain their rectangular shape without apparent distortions with increasing scan rates up to an ultrahigh rate of 10,000 mV/s, indicating the high rate capability of this asymmetric supercapacitor. Interestingly, the asymmetric cell presents a wide and stable operating potential window up to 2.0 V in aqueous electrolyte that should afford high energy density. Furthermore, as the $MnO_2$ deposition time is increased from 3 min to 960 min, the stack capacitance increases significantly from around 3 to 76 $F/cm^3$, meaning that the stored energy and power can be greatly improved in the asymmetric structure. These cells can also retain their high capacity when faster charge and discharge rates are needed. The as-fabricated supercapacitor is highly flexible and can be folded and twisted without affecting the structural integrity of the device. In addition, the supercapacitor delivers almost the same capacity even when placed under high bending conditions, holding promise as a practical energy storage system for flexible electronics.

Long cycle life is another important feature for commercially viable supercapacitors. Indeed, the asymmetric supercapacitor is very stable as it maintains over 96% of its original capacity after 10,000 charge/discharge cycles tested at a high scan rate of 1000 mV/s. The equivalent series resistance (ESR) of the supercapacitor was monitored during cycling using a Nyquist plot. The device demonstrates a slight increase of ESR in the first 1000 cycles with only subtle changes over the remaining cycles.

Three-Dimensional Interdigitated Micro-Supercapacitors

Three-dimensional interdigitated micro-supercapacitors. The development of miniaturized electronic systems such as smart sensors, implantable medical devices and micro-electromechanical systems (MEMS) has led to an increasing demand for microscale supercapacitors with high energy density in a limited space. This characteristic is crucial in the miniaturization of energy storage devices for modern electronic applications. Previous research has focused on increasing the micro-supercapacitor energy density by using different active materials such as activated carbon, graphene, carbon nanotubes, polymers and metal oxides. The development of micro-supercapacitors with high capacity per footprint area is crucial for the miniaturization of energy storage devices for modern electronic applications. Unfortunately, current state-of-the-art systems still suffer from low areal capacity: <11.6 $mF/cm^2$ for carbons, and <78 $mF/cm^2$ for conducting polymers and <56.3 for metal oxides. New hybrid micro-supercapacitors were fabricated, in which the positive and negative electrodes are separated into a 3D interdigitated structure. This structure was achieved by combining the techniques of "top down" LightScribe lithography with "bottom up" selective electro-deposition. First, 3D interdigitated ICCN microelectrodes were produced by the direct writing of graphene patterns on GO films using a consumer grade LightScribe DVD burner. A device fabricated comprises 16 in-plane microelectrodes (8 positive and 8 negative) separated by nearly insulating GO and the distance between the microelectrodes is close enough to keep the ion-transport pathway short. Subsequently, $MnO_2$ nanoflowers were selectively electrodeposited on one set of the ICCN micro-electrodes using a standard 3-cell setup. The width of the micro-electrodes is adjusted to match the charge between the positive and negative poles of the micro-device. The lighter microelectrodes correspond to bare graphene (negative electrodes), whereas the other side turns darker in color after the electrodeposition of $MnO_2$ (positive electrodes). The optical microscope image shows a well-defined pattern and sharp boundaries between the microelectrodes.

Electrochemical characterization shows that the asymmetric micro-supercapacitor provides enhanced volumetric capacitance and rate capability compared to a conventional sandwich-type asymmetric supercapacitor. Symmetric hybrid micro-supercapacitors show a similar behavior with the areal capacitance approaching 400 $mF/cm^2$. This is likely due to the planar structure of the microdevices that results in better volumetric packing efficiency by eliminating the need for the polymer separator typically used in the sandwich structure to avoid short circuiting between electrodes. Moreover, the micro-scale architecture of the devices results in a significant reduction of the mean ionic diffusion pathway between the two microelectrodes. This is consistent with previous results with all-graphene micro-supercapacitors. This is believed to be the highest areal capacitance achieved so far in an interdigitated micro-supercapacitor. The stack capacitance significantly improves to ~250 $F/cm^3$ (volumetric capacitance per electrode is 1197 $F/cm^3$) which is much higher than values previously reported for EDLC, pseudo- and hybrid micro-supercapacitors: 1.3 $F/cm^3$ for carbon onions, 2.35-3.05 $F/cm^3$ for graphene, 1.08 $F/cm^3$ for CNT, 3.1 $F/cm^3$ for graphene/CNT, 180 $F/cm^3$ (electrode) for carbide-derived carbon, 588 $F/cm^3$ for polyaniline nanofibers, 317 $F/cm^3$ (electrode) for vanadium disulfide nanosheets and 178 $F/cm^3$ for molybdenum disulfide nanosheets.

Discussion

The energy and power density of the $ICCN/MnO_2$-based supercapacitors are superior to current technology. In order to put these results in perspective with current technology, a number of commercially available carbon-based supercapacitors, pseudo-capacitors, hybrid supercapacitors, and Li ion hybrid capacitors were characterized. These devices were tested under the same dynamic conditions as $ICCN/MnO_2$. For all devices, the calculations were made based on the volume of the full cell that includes the current collector, active material, separator and electrolyte. The energy density of the hybrid $ICCN/MnO_2$ varies between 22 to 42 Wh/l depending on the configuration (symmetric, asymmetric and sandwich, interdigitated) and the mass loading of $MnO_2$. By comparison, the $ICCN/MnO_2$ hybrid supercapacitors store about 6 times the capacity of state-of-the-art commercially available EDLC carbon supercapacitors. They are also superior to pseudo-capacitors, hybrid supercapacitors and supercapacitor/lithium ion battery hybrid (Li-ion capacitors). Furthermore, $ICCN/MnO_2$ supercapacitors can provide power densities up to ~10 kW/l, which is 100 times faster than high-power lead acid batteries and 1000 times faster than a lithium thin film battery.

To meet the high voltage requirements, supercapacitors are often put into a bank of cells connected together in series. This results in bulky supercapacitor modules which are appropriate in some cases, but often cause problems in applications where the total size of the power source is critical. Propose here is a different design in which an array of separate electrochemical cells are directly fabricated in the same plane and in one step. This configuration shows a very good control over the voltage and current output. In addition, this array can be integrated with solar cells for efficient solar energy harvesting and storage.

In summary, this disclosure provides a simple and scalable approach for the fabrication of hybrid $ICCN/MnO_2$ three-dimensional supercapacitors and micro-supercapacitors that are compact, reliable, and energy dense, charge quickly, and possess long lifetime. Given that $MnO_2$ is widely used in alkaline batteries (selling approximately 10 billion units per year (34)) and the scalability of carbon-based materials. In particular, $ICCN/MnO_2$ hybrid electrodes offer promise for real world applications.

Materials and Methods

Synthesis of $ICCN/MnO_2$, $Au/MnO_2$ and $CCG/MnO_2$ Electrodes

The ICCN was prepared by focusing a laser beam from a LightScribe DVD burner on a DVD disc coated with graphite oxide. First, the DVD disc is covered by a film of gold coated polyimide (Astral Technology Unlimited, Inc.) or a sheet of polyethylene terephthalate. This was coated with a 2% GO dispersion in water using the doctor blade technique and left for drying for 5 hours under ambient conditions. A computer designed image is printed onto graphite oxide to make the appropriate ICCN pattern. This was followed by the electro-deposition of $MnO_2$ from 0.02 M $Mn(NO_3)_2$ in 0.1 M $NaNO_3$ aqueous solution using a standard three electrode setup, where a piece of ICCN (1 $cm^2$) is used as the working electrode, Ag/AgCl as the reference electrode (BASi, Indiana, USA) and a platinum foil (2 $cm^2$, Sigma-Aldrich) as the counter-electrode. The deposition was achieved by applying a constant current of 250 $\mu A/cm^2$ for different time periods between 3 and 960 min. After electro-deposition, the working electrode was thoroughly washed with DI water to remove the excess electrolyte and dried in an oven at 60° C. for 1 h. The amount of $MnO_2$ deposited on the ICCN was determined from the difference in weight of the electrode before and after electro-deposition using a high precision microbalance with a readability of 1 $\mu g$ (Mettler Toledo, MX5).

For comparison, $MnO_2$ was electrodeposited on other substrates such as gold-coated polyimide and graphene (CCG) paper. The gold-coated polyimide was obtained from Astral Technology Unlimited, Inc. (Minnesota, USA) and used without further treatment. The graphene paper was produced following our previously reported method. The gold-coated polyimide and graphene paper were cut into rectangular strips of 1 $cm^2$ for further electro-deposition of $MnO_2$ under the same conditions as described above.

Assembly of Sandwich-Type Hybrid Supercapacitors

Hybrid supercapacitors with the conventional sandwich structure were assembled using electrodes prepared in the previous section. Both symmetric and asymmetric supercapacitors were constructed. Symmetric supercapacitors were assembled by sandwiching a Celgard M824 (Celgard, North Carolina, USA) separator between two identical electrodes using 1.0 M $Na_2SO_4$ aqueous solution as the electrolyte. In the asymmetric structure, ICCN/$MnO_2$ was used as the positive electrode and ICCN as the negative electrode. For the ICCN- and CCG-based supercapacitors, stainless steel (or copper) tape was attached to the electrodes, using silver paint, as the current collector. Before assembly, the electrodes were soaked in the electrolyte for 1 h to ensure proper wetting.

Fabrication of Interdigitated Hybrid Micro-Supercapacitors

The fabrication process of a micro-supercapacitor is illustrated in FIG. 5B and described below. First, ICCN interdigitated microelectrodes were printed directly on a GO film supported on a gold coated polyimide (or a polyethylene terephthalate) substrate using a consumer grade DVD burner. Second, $MnO_2$ nanoflowers were grown on one set of the interdigitated electrodes using the electro-deposition setup described above. The applied current was normalized to the active ICCN deposition area at a current density of 250 $\mu A/cm^2$ and the mass loading was controlled by adjusting the deposition time. Likewise, symmetric micro-supercapacitors based on ICCN/$MnO_2$ as both the positive and the negative electrodes were prepared as well. Here, the fabrication process is the same except that the two sides (instead of one side) of the bare interdigitated ICCN electrodes were connected together using copper tape and used as the working electrode during electro-deposition.

The hybrid electrodes embodied in the present disclosure can provide energy and power higher than that of any of the patented or published methods indicated in the subsequent reference lists. They are also superior to commercially available carbon-based supercapacitor, pseudo-capacitors, hybrid supercapacitors, and lithium ion capacitors tested under the same conditions.

The present disclosure describes a facile technique for the miniaturization of these hybrid supercapacitors to the microscale. These micro-supercapacitors enable an ultrahigh areal capacitance of more than 400 $mF/cm^2$, which is higher than any performance achieved so far in the previous publications and patent applications. The hybrid supercapacitors can also provide an energy density of 22 Wh/l, more than two times higher than that of a lithium thin film battery. Clearly, the hybrid supercapacitors are advantageous compared with related art.

Another challenge is the working voltage of existing supercapacitors that is typically lower than 3 V, whereas capacitors used for general electronics applications typically range from a few volts to 1 kV. To solve this problem, the present disclosure describes, but is not limited to, one embodiment that is a different design in which an array of electrochemical cells is directly fabricated in the same plane and in one step. This configuration provides an operating voltage window of 6 V. In addition, the present disclosure describes a path to increase the voltage further. These arrays can be integrated with solar cells to produce efficient solar energy harvesting and storage systems.

Uses of the hybrid supercapacitors described in the present disclosure include, but are not limited to, the following areas:

1. Portable electronics: cellphones, computers, cameras, for example.
2. Medical devices: life-sustaining and life-enhancing medical devices including pacemakers, defibrillators, hearing aids, pain management devices, and drug pumps.
3. Electric vehicles: High-power batteries with long lifetime are needed to improve the electric vehicles industry.
4. Space: High-power batteries with long lifetime can be used in space to power space systems including rovers, landers, spacesuits, and electronic equipment.
5. Military batteries: The military uses special batteries for powering a huge number of electronics and equipment. Of course, reduced mass/volume is highly preferred.
6. Electric aircraft: an aircraft that runs on electric motors rather than internal combustion engines, with electricity coming from solar cells or batteries.
7. Grid scale energy storage: Batteries are widely used to store electrical energy during times when production (from power plants) exceeds consumption and the stored energy is used at times when consumption exceeds production.
8. Renewable energy: Since the sun does not shine at night and the wind does not blow at all times, batteries have found their way to off-the-grid power systems to store excess electricity from renewable energy sources for use during hours after sunset and when the wind is not blowing. Of course, high-power batteries can harvest energy from solar cells with higher efficiency than the current state-of-the-art batteries.
9. Power tools: High-power batteries with long lifetime would enable fast-charging cordless power tools such as drills, screwdrivers, saws, wrenches, and grinders. The trouble with current batteries is long recharging time.

10. Miniaturized electronics: The microscale hybrid supercapacitors can be used to provide power to microelectronic devices such as micro-electromechanical systems (MEMS), smart sensors, implantable medical devices, and radio frequency identification (RFID) tags for which high capacity per footprint is crucial.

Supercapacitors now play an important role in the progress of hybrid and electric vehicles, consumer electronics, military and space applications. There is a growing demand in developing hybrid supercapacitor systems to overcome the energy density limitations of the current generation of carbon-based supercapacitors. Here, we demonstrate 3D high-performance hybrid supercapacitors and micro-supercapacitors based on graphene and $MnO_2$ by rationally designing the electrode microstructure and combining active materials with electrolytes that operate at high voltages. This results in hybrid electrodes with ultrahigh volumetric capacitance of over 1100 F/cm$^3$. This corresponds to a specific capacitance of the constituent $MnO_2$ of 1145 F/g, which is close to the theoretical value of 1380 F/g. The energy density of the full device varies between 22-42 Wh/l depending on the device configuration, which is superior to those of commercially available double layer supercapacitors, pseudo-capacitors, lithium ion capacitors and hybrid supercapacitors tested under the same conditions and is comparable to that of lead acid batteries. These hybrid supercapacitors use aqueous electrolytes and are assembled in air without the need for expensive 'dry rooms' required for building today's supercapacitors. Furthermore, we demonstrate a simple technique for the fabrication of supercapacitor arrays for high voltage applications. These arrays can be integrated with solar cells for efficient energy harvesting and storage systems.

As a result of the rapidly growing energy needs of modern life, the development of high performance energy storage devices has gained significant attention. Supercapacitors are promising energy storage devices with properties intermediate between those of batteries and traditional capacitors, but they are being improved more rapidly than either. Over the past couple of decades, supercapacitors have become key components of everyday products by replacing batteries and capacitors in an increasing number of applications. Their high power density and excellent low temperature performance have made them the technology of choice for back-up power, cold starting, flash cameras, regenerative braking and hybrid electric vehicles. The future growth of this technology depends on further improvements in energy density, power density, calendar and cycle life and production cost.

According to their charge storage mechanism, supercapacitors are classified as either electric double layer capacitors (EDLCs) or pseudo-capacitors. In EDLCs, charge is stored through rapid adsorption/desorption of electrolyte ions on high-surface-area carbon materials, whereas pseudo-capacitors store charge via fast and reversible Faradaic reactions near the surface of metal oxides or conducting polymers. The majority of supercapacitors currently available in the market are symmetric EDLCs featuring activated carbon electrodes and organic electrolytes that provide cell voltages as high as 2.7 V (2). Although commercial EDLCs exhibit high power density and excellent cycle life, they suffer from low energy density because of the limited capacitance of carbon-based electrodes. The specific pseudo-capacitance of Faradaic electrodes (typically 300-1000 F/g) exceeds that of carbon-based EDLCs, however, their performance tend to degrade quickly up on cycling (2-4).

Studies during the past few years have demonstrated an attractive alternative to conventional EDLCs and pseudo-capacitors by employing hybrid systems. Utilizing both Faradaic and non-Faradaic processes to store charge, hybrid capacitors can achieve energy and power densities greater than EDLCs without sacrificing the cycling stability and affordability that have so far limited the success of pseudo-capacitors. Several combinations of materials, such as $RuO_2$ (6), $Co_3O_4$ (7), NiO (8), $V_2O_5$ (9), $Ni(OH)_2$ (10), and $MnO_2$ (11) have been studied for preparing hybrid supercapacitors. Among these, $MnO_2$-based systems are particularly attractive as $MnO_2$ is an earth abundant and environmentally friendly material with a high theoretical specific capacitance of 1380 F/g (12). However, the poor ionic ($10^{-13}$ S/cm) and electronic ($10^{-5}$-$10^{-6}$ S/cm) conductivity of pristine $MnO_2$ often limits its electrochemical performance. Recent reports show that some high-performance results can be achieved only from ultrathin $MnO_2$ films that are a few tens of nanometers in thickness. Nevertheless, the thickness and the area-normalized capacitance of these electrodes are not adequate for most applications. A promising approach to realize practical applications of $MnO_2$ is to incorporate nanostructured $MnO_2$ on highly conductive support materials with high surface areas such as nickel foam, nickel nanocones, Mn nanotubes, activated carbon, carbon foam, carbon fabric, conducting polymers, carbon nanotubes and graphene. Although promising specific capacitances of 148-410 F/g have been achieved, such values were obtained only under slow charge/discharge rates and they were found to decrease rapidly as the discharge rate was increased. Moreover, many of these materials have low packaging density with large pore volume, meaning that a huge amount of electrolyte is needed to build the device, which adds to the mass of the device without adding any capacitance. Accordingly, the energy density and power density of these systems are very limited on the device level. To solve these critical problems, we have developed promising hybrid electrodes based on three-dimensional graphene doped with $MnO_2$ nanoflowers. By rationally designing the structure of the graphene substrate to achieve high conductivity, suitable porosity, and high specific surface area, one may expect to not only achieve a high gravimetric capacitance, but also to improve the volumetric capacitance. Furthermore, the high surface area of nanostructured $MnO_2$ provides more active sites for the Faradaic reactions and shortens the ion diffusion pathways that are crucial for realizing its full pseudo-capacitance. We show that hybrid supercapacitors based on these materials can achieve energy densities of up to 41 Wh/l compared to 7 Wh/l for state-of-the-art commercially available carbon-based supercapacitors. Interestingly, these graphene/$MnO_2$ hybrid supercapacitors use aqueous electrolytes and are assembled in air without the need for the expensive "dry rooms" required for building today's supercapacitors.

While great efforts have been made for the fabrication of macro-scale hybrid supercapacitors, there are only a few studies on the design and integration of hybrid materials into micro-supercapacitors. This is likely due to complicated micro-fabrication techniques that often involve building 3D micro-electrodes with micro-meter separations. Here, we present a simple, yet versatile technique for the fabrication of 3D hybrid micro-supercapacitors based on graphene and $MnO_2$. These micro-devices enable an ultrahigh capacitance per footprint approaching 400 mF/cm$^2$, which is among the highest values achieved for any micro-supercapacitor. They can also provide an energy density of up to 22 Wh/l, more than two times that of lithium thin film batteries. These developments are promising for microelectronic devices such as biomedical sensors and radio frequency identification (RFID) tags where high capacity per footprint is crucial.

Rational design of high-performance hybrid supercapacitors. In designing supercapacitor electrodes, special efforts are made to ensure that they are capable of providing high energy density and high power density. This requires optimization of the preparation conditions to facilitate ionic and electronic transport within the electrodes. However, this is very challenging especially with metal oxide pseudo-capacitors because of the low electrical conductivity and long ionic diffusion pathways of conventional metal oxide films. Thus, in conventional compact $MnO_2$ thick film electrodes, only the top layer is exposed to the electrolyte, meaning that a limited amount of the active material is involved in charge storage. To solve these problems, various approaches have been explored in the literature. For example, the electrochemical utilization of electrodes was improved by using nanostructured $MnO_2$ such as nanoparticles, nanorods, nanowires and nanoflowers. The porous structure of these electrodes maximizes the area of active material that is exposed to the electrolyte and thus available to discharge compared to a solid electrode surface. Although this system exhibits higher energy density, it still suffers from the inherently low electrical conductivity of $MnO_2$ leading to low power output. To improve the electrical conductivity of $MnO_2$ film, conductive materials such as carbon powder, carbon nanotubes and graphene have been introduced into nanostructured $MnO_2$ electrodes. However, the electronic charge carriers must move through small inter-particle contact areas which exhibit additional resistance resulting in poor electron transport from the electrode material to the current collector. An ideal electrode would be obtained by growing $MnO_2$ nanostructures onto ICCN with high electrical conductivity and high surface area. In this structure, the conducting ICCN acts as a 3D current collector to provide electron "superhighways" for charge storage and delivery, while the nanostructured $MnO_2$ enables fast, reversible Faradaic reactions with short ionic diffusion pathways. Another interesting feature of this structure is that each $MnO_2$ nanoparticle is electrically connected to the current collector so that all the nanoparticles contribute to capacity with almost no "dead" mass.

Synthesis and characterization of 3D macroporous ICCN/$MnO_2$ electrodes. To experimentally realize energy dense and high power supercapacitor electrodes, a highly conductive and high surface area ICCN was integrated with $MnO_2$ as schematically illustrated in FIG. 3. The ICCN was produced from the laser scribing of carbon-based films such as graphite oxide (GO) upon which the color changes from golden brown to black. The ICCN was subsequently coated in situ with $MnO_2$ using an electrochemical deposition technique as described in the Methods section. This in situ growth technique enables $MnO_2$ to be strongly anchored onto the ICCN, thus enabling reduced contact resistance and better electrochemical utilization of $MnO_2$. The ICCN electrode turns darker in color after electro-deposition, a visual indication of the loading of $MnO_2$. It is well accepted that the conductivity and mass loading of the active materials have a significant impact on the electrochemical behavior of supercapacitor electrodes. Here, the mass loading of $MnO_2$ is controlled by adjusting the deposition current and deposition time. The $MnO_2$ loading changes almost linearly with the deposition time at an applied current of 0.25 mA/$cm^2$ and an average deposition rate estimated to be ~6 μg/min.

In addition to interesting electrical properties, the ICCN/$MnO_2$ electrodes are monolithic and demonstrate superb mechanical integrity under large mechanical deformation. An ICCN/$MnO_2$ electrode can be bent significantly without damage. The foldability of ICCN/$MnO_2$ electrodes was evaluated by measuring their electrical resistance under successive bending cycles. The resistance varies only slightly up to a bending radius of 5.0 mm and can be completely recovered after straightening no matter whether the bending is positive (convex) or negative (concave. Notably, after 1000 cycles of bending and straightening at a concave bend radius of 5.0 mm, the resistance has increased by only about 2.8%. These measurements demonstrate the excellent electro-mechanical properties of ICCN/$MnO_2$ electrodes, which is highly desirable for applications in flexible and wearable electronics.

The evolution of morphology corresponding to different deposition times was examined by scanning electron microscopy. The SEM micrographs show the general morphology and detailed microstructure of a typical sample prepared by 60 minutes of deposition. $MnO_2$ has been uniformly coated onto the surface of graphene throughout the entire film. Moreover, the electrodeposited $MnO_2$ particles show a nanoflower-shaped hierarchical architecture with a clear interface between $MnO_2$ and the graphene substrate, which is consistent with previous studies. Closer inspection of the $MnO_2$ nanoflowers shows that they are made up of hundreds of ultrathin nanoflakes that are 10-20 nm thick. These nanoflakes are interconnected together to form mesoporous $MnO_2$ with a large accessible surface area, thus offering numerous electroactive sites available to the electrolyte which promotes fast surface Faradaic reactions.

The 3D structure of ICCN/$MnO_2$ electrodes was further analyzed using cross-sectional SEM. The 3D porous structure of ICCN is preserved after the deposition of $MnO_2$ without any agglomerations. The graphene surface has been uniformly coated with $MnO_2$ over the entire cross-section. In addition, energy-dispersive X-ray spectroscopy (EDS) provides elemental maps of C, O and Mn, which confirms that a homogeneous coating of $MnO_2$ throughout the ICCN has been created. As a control for comparison, the electrodeposition of $MnO_2$ was carried out on both chemically converted graphene (CCG) and gold substrates. Unlike the ICCN, the electrodeposition of $MnO_2$ occurs only on the top surface of the CCG, whereas a thick and compact film of $MnO_2$ is deposited on gold. In addition, both the CCG/$MnO_2$ and Au/$MnO_2$ electrodes showed poor mechanical properties compared to ICCN/$MnO_2$.

XPS was successfully used for better understanding of the chemical composition and the oxidation state of Mn in the ICCN/$MnO_2$ electrodes. The Mn 2p and Mn 3s spectra. The peaks of Mn $2p_{3/2}$ and Mn $2p_{1/2}$ are located at 642.1 and 653.9 eV, respectively, with a spin energy separation of 11.6 eV, which is in good agreement with data for Mn 2p states previously reported. Toupin et al. showed that the peak separation of the Mn 3s doublet is related to the oxidation state of Mn in manganese oxides, where reference samples of MnO, $Mn_3O_4$, $Mn_2O_3$ and $MnO_2$ showed a separation of 5.79, 5.50, 5.41 and 4.78 eV, respectively. The as-prepared ICCN/$MnO_2$ showed a separation energy of 4.8 eV for the Mn 3s doublet, suggesting that the oxide is $MnO_2$ which was further confirmed from the O 1s spectrum.

Assembly and electrochemical performance of symmetric ICCN/$MnO_2$ supercapacitors. In order to test the electrochemical performance of ICCN/$MnO_2$ macroporous frameworks, a supercapacitor pouch cell was assembled from two symmetric electrodes separated by a Celgard M824 ion porous separator and impregnated with 1.0 M $Na_2SO_4$ electrolyte. The cells were tested by cyclic voltammetry (CV) over a wide range of scan rates from 1 mV/s-1000 mV/s. As an example, consider the ICCN/MnO$_2$ sample with a deposition time of 3 minutes, the supercapacitor shows nearly rectangular CV profiles up to a scan rate as high as 1000 mV/s, indicating excellent charge storage characteristics and ultrafast response time for the electrodes. The capacitances of the devices made with different deposition times were calculated from CV profiles. Note that the capacitance was calculated using the total volume of the cell stack, rather than a single electrode. This includes the volume of the current collector, the active material, the separator and the electrolyte.

The capacitance depends strongly on the loading amount of the pseudo-capacitive MnO$_2$ and increases significantly with deposition time from 0-960 min. For example, a stack capacitance of up to ~203 F/cm$^3$ can be achieved with the sample at a 960 min deposition time. This translates to a volumetric capacitance of 1136.5 F/cm$^3$ when calculated based on the volume of the active material per electrode only. This value is much higher than the capacitance of activated carbons (60-80 F/cm$^3$), carbide-derived carbons (180 F/cm$^3$), bare ICCN (12 F/cm$^3$), activated MEGO (60 F/cm$^3$) and liquid mediated CCG films (263.3 F/cm$^3$), indicating that the volumetric capacitance of carbon based electrodes can be significantly improved by incorporating pseudo-capacitive materials. Furthermore, this value is higher than some of the best values reported previously for MnO$_2$ based supercapacitors: 16.1 F/cm$^3$ for CNT/PPy/MnO$_2$ sponge, 130 F/cm$^3$ for graphene/MnO$_2$/CNT, 246 F/cm$^3$ for CNT/MnO$_2$, 108 F/cm$^3$ for meso-porous carbon/MnO$_2$ and 90 F/cm$^3$ for ultra-porous carbon/MnO$_2$. In addition, depending on the deposition time, ultrahigh areal capacitances of up to ~0.8 F/cm$^2$ per footprint of the device can be achieved. This compares favorably with commercial carbon supercapacitors that typically provide ~0.3 F/cm$^2$.

Supercapacitors are widely used in a variety of applications where a large amount of power is needed for a short period of time, where a very large number of charge/discharge cycles or a longer lifetime is required. However, the working voltage of existing supercapacitors is very low (<3 volts), whereas traditional capacitors used for general electronics applications typically range from a few volts to 1 kV. To meet the high voltage requirements, supercapacitors are often put into a bank of cells connected together in series. This results in bulky supercapacitor modules which are appropriate in some cases, but often cause problems in applications where the total size of the power source is critical. Here, we propose a different design in which an array of separate electrochemical cells are directly fabricated in the same plane and in one step. This configuration offers the flexibility of controlling the output voltage and current of the array. Compared with a single device with an operating voltage of 2 V, an array of 3 serial cells extends the output voltage to 6 V, whereas the output capacity (runtime) can be increased by a factor of 3 using an array of 3 cells connected in parallel. By using an array of 3 strings in parallel and 3 strings in series, the output voltage and current can both be tripled. Although the high-voltage supercapacitor array was demonstrated using a string of 3 cells, it is possible to increase the number of cells to reach an operating voltage of 100 V, which would be promising for a variety of applications.

With growing interest in "green" systems, solar power is gaining popularity for the implementation in more energy efficient buildings and smart cities. When combined with an energy storage system for storing energy during the day, they can be used to make self-powered systems that are promising for streetlight, industrial wireless monitoring, transportation and consumer electronics applications. Chemical batteries are often used in these systems due to their high energy density. Recently, supercapacitors are emerging as alternatives because they can capture energy more efficiently due to their short response time. These modules are struggling, though, because of the low energy density of existing supercapacitors. Since ICCN/MnO$_2$ hybrid supercapacitors can provide higher energy density and because they can be fabricated in arrays with high voltage and current ratings, they can be integrated with solar cells for highly efficient energy harvesting and storage.

In summary, we have developed a simple and scalable approach for the fabrication of hybrid ICCN/MnO$_2$ three-dimensional electrodes. ICCN with its high electrical conductivity and porous structure is demonstrated to be an excellent scaffold for MnO$_2$ nanoparticles. The unique structure of these hybrid electrodes allows efficient use of the pseudo-capacitive properties of MnO$_2$, while providing facilitated transport of both electrolyte ions and electrons. As a result, these supercapacitors exhibit high specific capacitance, an ultrafast charge/discharge rate, excellent cycling stability and high power density. They can store up to 6 times more charge than commercial carbon supercapacitors. These cells are fabricated in air without the need for expensive organic electrolytes or expensive dry rooms required for building today's supercapacitors. Given that MnO$_2$ is widely used in alkaline batteries (selling approximately 10 billion units per year) and the scalability of graphene-based materials, we believe that graphene/MnO$_2$ hybrid electrodes offer promise for real world applications.

Synthesis of ICCN/MnO$_2$, Au/MnO$_2$ and CCG/MnO$_2$ electrodes. The ICCN was prepared using our previously reported method. A film of gold coated polyimide (Astral Technology Unlimited, Inc.) or polyethylene terephthalate was used as the substrate. This was followed by the electro-deposition of MnO$_2$ from 0.02 M Mn(NO$_3$)$_2$ in 0.1 M NaNO$_3$ aqueous solution using a standard three electrode setup, where a piece of ICCN (1 cm$^2$) is used as the working electrode, Ag/AgCl as the reference electrode (BASi, Indiana, USA) and a platinum foil (2 cm$^2$, Sigma-Aldrich) as the counter-electrode. The deposition was achieved by applying a constant current of 250 µA/cm$^2$ for different time periods between 3 and 960 min. After electro-deposition, the working electrode was thoroughly washed with DI water to remove the excess electrolyte and dried in an oven at 60° C. for 1 h. The amount of MnO$_2$ deposited on the ICCN was determined from the difference in weight of the electrode before and after electro-deposition using a high precision microbalance with a readability of 1 µg (Mettler Toledo, MX5).

For comparison, MnO$_2$ was electrodeposited on other substrates such as gold-coated polyimide and graphene (CCG) paper. The gold-coated polyimide was obtained from Astral Technology Unlimited, Inc. (Minnesota, USA) and used without further treatment. The graphene paper was produced following our previously reported method. The gold-coated polyimide and graphene paper were cut into rectangular strips of 1 cm$^2$ for further electro-deposition of MnO$_2$ under the same conditions as described above.

Assembly of sandwich-type hybrid supercapacitors. Hybrid supercapacitors with the conventional sandwich structure were assembled using electrodes prepared in the previous section. Both symmetric and asymmetric supercapacitors were constructed. Symmetric supercapacitors were assembled by sandwiching a Celgard M824 (Celgard, North Carolina, USA) separator between two identical electrodes using 1.0 M Na$_2$SO$_4$ aqueous solution as the electrolyte. In the asymmetric structure, ICCN/MnO$_2$ was used as the positive electrode and ICCN as the negative electrode. For the ICCN- and CCG-based supercapacitors, stainless steel (or copper) tape was attached to the electrodes, using silver paint, as the current collector. Before assembly, the electrodes were soaked in the electrolyte for 1 h to ensure proper wetting.

Characterization and Measurements

The morphology and microstructure of the different electrodes were investigated by means of field emission scanning electron microscopy (JEOL 6700) equipped with energy dispersive spectroscopy (EDS) and optical microscopy (Zeiss Axiotech 100). XPS analysis was performed using a Kratos Axis Ultra DLD spectrometer. The thicknesses of the different components of the device were measured using cross-sectional scanning electron microscopy and a Dektak 6 profilometer. The electrochemical performances of the ICCN-MSC supercapacitors were investigated by cyclic voltammetry (CV), galvanostatic charge/discharge tests and electrochemical impedance spectroscopy (EIS). CV testing was performed on a VersaSTAT3 electrochemical workstation (Princeton Applied Research, USA). Charge/discharge and EIS measurements were recorded on a VMP3 workstation (Bio-Logic Inc., Knoxville, Tenn.) equipped with a 10 A current booster. EIS experiments were carried out over a frequency range of 1 MHz to 10 mHz with an amplitude of 10 mV at open-circuit potential.

Porous ICCN Composite Pore Structure

Pore structure of porous ICCN was analyzed from two forms of carbon-based two dimensional materials, which are chemically converted graphene (CCG) films and laser scribed graphene (ICCN) films. The CCG sheets are well connected together in a layered structure to form the CCG electrodes. The reduced porosity and limited accessibility to electrolyte ions causes a slow frequency response of ~5 seconds for CCG electrodes. ICCN electrodes, on the other hand, have a well-defined porous structure such that the individual graphene sheets in the ICCN network are accessible to the electrolyte, and thus exhibit a rapid frequency response of 23 ms. This causes the enhanced capacitance and rate capability observed with the ICCN/MnO$_2$. The optimized structure of ICCN electrodes synergizes the effects of both effective ion migration and high electroactive surface area, thus enabling high and reversible capacitive behavior for ICCN/MnO$_2$ even at high charge/discharge rates.

Further understanding of the capacitive behavior of the CCG/MnO$_2$ and ICCN/MnO$_2$ hybrid electrodes was obtained by conducting ac impedance measurements in the frequency range 1 MHz to 10 MHz. For each of these cells, MnO$_2$ was electrodeposited for 120 min. The Nyquist plots consist of a spike at the low frequency region and a semicircle at the high frequency region. Compared with CCG/MnO$_2$, the ICCN/MnO$_2$ supercapacitor shows a much smaller diameter for the semicircle, which suggests a more efficient charge transfer on the electrode surface. Furthermore, in the low frequency region, a more vertical straight line is observed for the porous ICCN/MnO$_2$ electrodes, indicating faster ion diffusion and almost ideal capacitive behavior for these electrodes. The intercept of the Nyquist curve on the real axis is about 1.5Ω, indicating a high conductivity for the electrolyte and low internal resistance of the electrodes. These results show the strong impact of the microstructure of the graphene electrodes on the electrochemical performance of their composites with metal oxides.

Direct fabrication of hybrid micro-supercapacitor array for high voltage applications. It is highly desirable to develop supercapacitor arrays with large operating voltages to meet the energy and power requirements of the system on which it will be integrated. This is very important given that the working voltage of existing supercapacitors is relatively low (<3 volts), whereas capacitors used for general electronics applications typically range from a few volts to 1 kV. To meet the high voltage requirements, supercapacitors are often put into a bank of cells connected together in series. Here, we propose a different design in which an array of separate electrochemical cells are directly fabricated in the same plane.

First, circuits are designed using appropriate computer software and are directly patterned on a graphite oxide film coated on a DVD disc. It is also possible to design patterns to make a supercapacitor bank of series/parallel combinations in order to meet the voltage (series) and current (parallel) requirements of the system on which they will be integrated.

The second step is the deposition of MnO$_2$ nanoflowers. Here, the deposition process varies depending on whether it is a symmetric or an asymmetric array. Ideally a gel electrolyte is used to prevent leakage into other cells in the array.

Calculations. The capacitances of the supercapacitors were calculated based on both cyclic voltammetry (CV) profiles and galvanostatic charge/discharge curves (CC). For the CV technique, the capacitance was calculated by integrating the discharge current (i) vs. potential (E) plots using the following equation:

$$C_{device} = \frac{\int i dV}{v \times \Delta E} \quad (1)$$

where v is the scan rate (V/s) and ΔE is the operating potential window.

The capacitance was also calculated from the charge/discharge (CC) curves at different current densities using the formula:

$$C_{device} = \frac{i_{app}}{dE/dt} \quad (2)$$

where $i_{app}$ is the current applied (in amps, A), and dV/dt is the slope of the discharge curve (in volts per second, V/s). Specific capacitances were calculated based on the area and the volume of the device stack according to the following equations:

$$\text{Areal capacitance} (C_A) = \frac{C_{device}}{A} \quad (3)$$

$$\text{Volumetric stack capacitance} (C_V) = \frac{C_{device}}{V} \quad (4)$$

where A and V refer to the area (cm$^2$) and the volume (cm$^3$) of the device, respectively. The stack capacitances (F/cm$^3$) were calculated taking into account the volume of the device stack. This includes the active material, the current collector and the separator with electrolyte.

The energy density of each device was obtained from the formula given in Equation (5):

$$E = \frac{1000}{2 \times 3600} C_v \Delta E^2 \qquad (5)$$

where E is the energy density in Wh/l, $C_v$ is the volumetric stack capacitance obtained from galvanostatic charge/discharge curves using Equation (3) in F/cm³ and $\Delta E$ is the operating voltage window in volts.

The power density of each device was calculated using the equation:

$$P = \frac{E}{t} \qquad (6)$$

where P is the power density in W/l and t is the discharge time in hours.

Since the majority of volumetric capacitances reported in the literature are based on the volume of the active material only, we applied the same calculations for the purpose of comparison using the following equations:
Volumetric Capacitance of the Device, $$C_{v(device)} = \frac{C_{device}}{V} \qquad (7)$$

where V is the volume of the active material on both electrodes
Volumetric Capacitance Per Electrode, $$C_{v(electrode)} = 4 \times C_{v(device)} \qquad (8)$$

Asymmetric cells. In order to achieve optimal performance with asymmetric supercapacitors, there should be a charge balance between the positive and negative electrodes. The charge stored by each electrode depends on its volumetric capacitance ($C_{v(electrode)}$), volume of the electrode (V), and the potential window in which the material operates ($\Delta E$).

$$q = C_{v(electrode)} \times V \times \Delta E \qquad (9)$$

To attain the charge balance, the following condition must be satisfied $$q_+ = q_- \qquad (10)$$

$$\frac{V_+}{V_-} = \frac{C_{v(electrode)-} \times \Delta E_-}{C_{v(electrode)+} \times \Delta E_+} \qquad (11)$$

The charge balance was achieved by adjusting the thickness of the positive and negative electrodes.

Comparison with commercial energy storage systems. In order to put the ICCN/MnO₂ hybrid supercapacitors and micro-supercapacitors into perspective, we tested the performance of a wide range of commercially available energy storage systems for comparison. This includes activated carbon supercapacitors, a pseudo-capacitor (2.6 V, 35 mF), a battery-supercapacitor hybrid (lithium ion capacitor) (2.3 V, 220 F), an aluminum electrolytic capacitor (3 V, 300 µF) and a lithium thin-film battery (4 V/500 µAh). Activated carbon supercapacitors of varying sizes were tested: small size (2.7 V, 0.05 F), medium size (2.7 V, 10 F) and large size (2.7 V, 350 F). The activated carbon large cell (2.7 V, 350 F) was tested at a lower current density of 160 mA/cm³ due to a limitation the measuring equipment that provides 10 A maximum current. All the devices were characterized under the same dynamic conditions as the ICCN/MnO₂ hybrid supercapacitors and micro-supercapacitors.

Those skilled in the art will recognize improvements and modifications to the embodiments of the present disclosure. All such improvements and modifications are considered within the scope of the concepts disclosed herein and the claims that follow.

What is claimed is:

1. A porous interconnected corrugated carbon-based network (ICCN) composite comprising:
   a plurality of one atom thick two-dimensional carbon sheets that are interconnected in a layered structure, wherein consecutively layered carbon sheets are directly coupled and expanded apart from one another to form a plurality of pores; and
   metallic nanoparticles disposed within the plurality of pores, wherein a percentage of surface area coverage of the metallic nanoparticles onto the plurality of one atom thick two-dimensional carbon sheets ranges from about 10% to about 95%.

2. The porous ICCN composite of claim 1 wherein an average minor axis diameter of the plurality of pores ranges (i) from about 2 nanometers to about 50 nanometers, or (ii) from about 50 nanometers to about 500 nanometers.

3. The porous ICCN composite of claim 1 wherein the metallic nanoparticles have a nanoflower shape.

4. The porous ICCN composite of claim 1 wherein the metallic nanoparticles are metal oxide particles.

5. The porous ICCN composite of claim 4 wherein the metallic nanoparticles are particles of manganese dioxide ($MnO_2$), ruthenium dioxide ($RuO_2$), cobalt oxide ($CO_3O_4$), nickel oxide (NiO), iron oxide ($Fe_2O_3$), copper oxide (CuO), molybdenum trioxide ($MoO_3$), vanadium pentoxide ($V_2O_5$), nickel hydroxide ($Ni(OH)_2$), or any combination thereof.

6. The porous ICCN composite of claim 1 wherein the porous ICCN composite (i) has an electrical conductivity that ranges from about 900 siemens/meter to about 1750 siemens/meter, or (ii) provides an energy density that ranges from about 2 Watt-hour/liter to about 41 Watt-hour/liter.

7. The porous ICCN composite of claim 1 wherein (i) an electrical conductivity of the plurality of one atom thick two-dimensional carbon sheets is greater than about 0.1 siemens/meter, (ii) a total surface area per unit mass of the plurality of one atom thick two-dimensional carbon sheets is at least about 1500 square meters per gram, or (iii) a total surface area per unit mass of the plurality of one atom thick two-dimensional carbon sheets ranges from about 1500 square meters per gram to about 1620 square meters per gram.

8. A method of producing porous ICCN composite comprising:
   providing a film comprising a mixture of a metallic precursor and a carbon-based oxide; and
   exposing at least a portion of the film to light to form a porous interconnected corrugated carbon-based network (ICCN) composite comprising:
   a plurality of one atom thick two-dimensional carbon sheets that are interconnected in a layered structure, wherein consecutively layered carbon sheets are directly coupled and expanded apart from one another to form a plurality of pores; and metallic nanoparticles disposed within the plurality of pores, wherein a percentage of surface area coverage of the metallic nanoparticles onto the plurality of one atom thick two-dimensional carbon sheets ranges from about 10% to about 95%, and wherein the light converts the metallic precursor to metallic nanoparticles.

9. The method of producing porous ICCN composite of claim 8 wherein providing the film comprising the mixture of the metallic precursor and the carbon-based oxide comprises:

providing a solution comprising a liquid, the metallic precursor, and the carbon-based oxide;

disposing the solution with the liquid, the metallic precursor, and the carbon-based oxide onto a substrate; and evaporating the liquid from the solution to form the film.

10. The method of producing the porous ICCN composite of claim 8 wherein the carbon-based oxide is graphite oxide.

11. The method of producing the porous ICCN composite of claim 8 wherein the metallic nanoparticles are particles of ruthenium oxide ($RuO_2$), cobalt oxide ($CO_3O_4$), nickel oxide (NiO), vanadium pentoxide ($V_2O_5$), iron oxide ($Fe_2O_3$), copper oxide (CuO), molybdenum trioxide ($MoO_3$), or any combination thereof.

12. The method of producing the porous ICCN composite of claim 8 wherein an electrical conductivity of the plurality of one atom thick two-dimensional carbon sheets is greater than about 0.1 siemens/meter.

13. The method of producing the porous ICCN composite of claim 8 wherein the porous ICCN composite has an electrical conductivity that ranges from about 900 siemens/meter to about 1750 siemens/meter.

14. A method of producing a porous interconnected corrugated carbon-based network (ICCN) composite comprising:

forming a porous ICCN composite comprising a plurality of one atom thick two-dimensional carbon sheets that are interconnected in a layered structure, wherein consecutively layered carbon sheets are directly coupled and expanded apart from one another to form a plurality of pores; and electrodepositing metallic nanoparticles within the plurality of pores, wherein a percentage of surface area coverage of the metallic nanoparticles onto the plurality of one atom thick two-dimensional carbon sheets ranges from about 10% to about 95%.

15. The method of producing the porous ICCN composite of claim 14 wherein forming the porous ICCN composite comprises providing a film made of a mixture of a carbon-based oxide by:

providing a solution comprising a liquid and the carbon-based oxide;

disposing the solution with the liquid and the carbon-based oxide onto a substrate;

evaporating the liquid from the solution to form the film; and exposing the film to light.

16. The method of producing the porous ICCN composite of claim 15 wherein the carbon-based oxide is graphite oxide.

17. The method of producing the porous ICCN composite of claim 14 wherein the metallic nanoparticles are particles of manganese dioxide (MnO2), ruthenium oxide ($RuO_2$), cobalt oxide ($CO_3O_4$), nickel oxide (NiO), vanadium pentoxide ($V_2O_5$), iron oxide ($Fe_2O_3$), copper oxide (CuO), molybdenum trioxide ($MoO_3$), nickel hydroxide ($Ni(OH)_2$), or any combination thereof.

18. The method of producing the porous ICCN composite of claim 14 wherein an electrical conductivity of the plurality of one atom thick two-dimensional carbon sheets is greater than about 0.1 siemens/meter.

19. The method of producing the porous ICCN composite of claim 15 wherein the porous ICCN composite has an electrical conductivity that ranges from about 900 siemens/meter to about 1750 siemens/meter.

20. The method of producing the porous ICCN composite of claim 14 wherein electrodepositing the metallic nanoparticles within the plurality of pores comprises:

submerging the porous ICCN composite into an aqueous solution having a metallic precursor; and applying an electrical current through the porous ICCN composite to electrodeposit the metallic nanoparticles into the plurality of pores.

21. The method of producing the porous ICCN composite of claim 20 wherein the electrical current has a current density of at least about 250 microamperes per square centimeter.

* * * * *